(12) United States Patent
VanBecelaere et al.

(10) Patent No.: US 10,942,006 B2
(45) Date of Patent: *Mar. 9, 2021

(54) PATTERN CONFIGURABLE RETICLE

(71) Applicant: Vista Outdoor Operations LLC, Farmington, UT (US)

(72) Inventors: Jacob C. VanBecelaere, Olathe, KS (US); Alejandro Chavez, Overland Park, KS (US)

(73) Assignee: Vista Outdoor Operations LLC, Anoka, MN (US)

( * ) Notice: Subject to any disclaimer, the term of this patent is extended or adjusted under 35 U.S.C. 154(b) by 158 days.

This patent is subject to a terminal disclaimer.

(21) Appl. No.: 16/180,663

(22) Filed: Nov. 5, 2018

(65) Prior Publication Data
US 2019/0072364 A1   Mar. 7, 2019

Related U.S. Application Data

(63) Continuation-in-part of application No. 15/608,617, filed on May 30, 2017, now Pat. No. 10,175,031.
(Continued)

(51) Int. Cl.
*G06K 19/00* (2006.01)
*F41G 1/54* (2006.01)
(Continued)

(52) U.S. Cl.
CPC ............ *F41G 1/545* (2013.01); *F41G 1/345* (2013.01); *F41G 1/38* (2013.01); *G06T 11/206* (2013.01); *F41G 1/30* (2013.01)

(58) Field of Classification Search
CPC . F41G 1/545; F41G 1/345; F41G 1/38; F41G 1/30; G06T 11/206
(Continued)

(56) References Cited

U.S. PATENT DOCUMENTS 6,088,082 A   7/2000 Yonekawa
7,703,679 B1  4/2010 Bennetts et al.
(Continued)

FOREIGN PATENT DOCUMENTS

TW   201307793 A   2/2013
TW   I531777 B     5/2016
(Continued)

OTHER PUBLICATIONS

International Search Report and Written Opinion cited in corresponding International Application No. PCT/US2019/059608 dated Jan. 24, 2020.
(Continued)

*Primary Examiner* — Karl D Frech
(74) *Attorney, Agent, or Firm* — Walter M. Egbert, III; Gerard M. Donovan; Reed Smith LLP

(57) ABSTRACT

A system, method, and device for configuring an optical aiming device for ballistic drop compensation (BDC). The optical aiming device can include a housing with a reticle pane defining a reticle display field viewable by a user and indicating a zero point, the housing further including a plurality of axially spaced lenses and defining an optical path therethrough. In various embodiments the system includes a display device configured to project an image generated from a display, a processor, and a non-transitory computer readable storage medium. The computer readable data storage medium can include instructions executable by the processor to receive a first set of ballistics input data indicating a first type of ammunition, determine a BDC pattern including at least two holdover marks corresponding to at least two ranges for the first type of ammunition, and project the BDC pattern onto the reticle display field.

20 Claims, 20 Drawing Sheets

Related U.S. Application Data

(60) Provisional application No. 62/342,485, filed on May 27, 2016.

(51) Int. Cl.
  *F41G 1/34* (2006.01)
  *F41G 1/38* (2006.01)
  *G06T 11/20* (2006.01)
  *F41G 1/30* (2006.01)

(58) Field of Classification Search
  USPC ............. 235/404, 407, 400, 414, 416, 417
  See application file for complete search history.

(56) References Cited

U.S. PATENT DOCUMENTS

| | | |
|---|---|---|
| 8,807,430 B2 | 8/2014 | Millett |
| 9,091,507 B2 | 7/2015 | Paterson et al. |
| 9,429,745 B2 | 8/2016 | Brumfield |
| 10,175,031 B2 * | 1/2019 | VanBecelaere ........ G02B 27/40 |
| 2005/0229468 A1 | 10/2005 | Zaderey et al. |
| 2007/0159701 A1 | 7/2007 | Campbell et al. |
| 2013/0033746 A1 | 2/2013 | Brumfield |
| 2013/0199074 A1 | 8/2013 | Paterson et al. |
| 2015/0241172 A1 * | 8/2015 | Roman .................. F41G 3/165 235/404 |
| 2017/0343317 A1 | 11/2017 | VanBecelaere |

FOREIGN PATENT DOCUMENTS

| | | |
|---|---|---|
| TW | I633272 B | 8/2018 |
| WO | 2013106280 A1 | 7/2013 |

OTHER PUBLICATIONS

Translation of Taiwan IPO Search Report, Taiwan Invention Patent Application No. 108139964; dated Oct. 25, 2020.

* cited by examiner

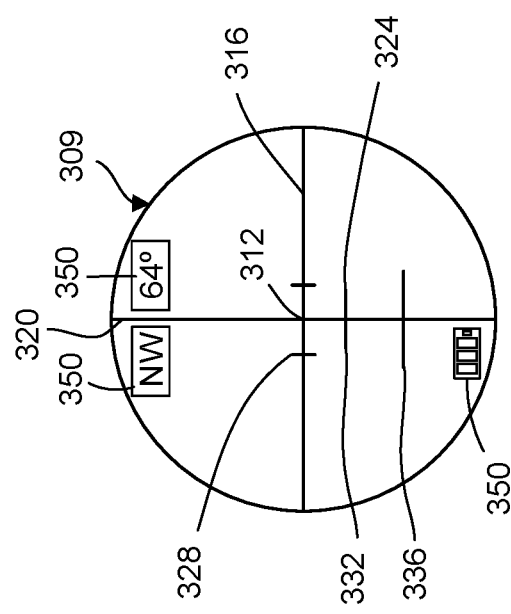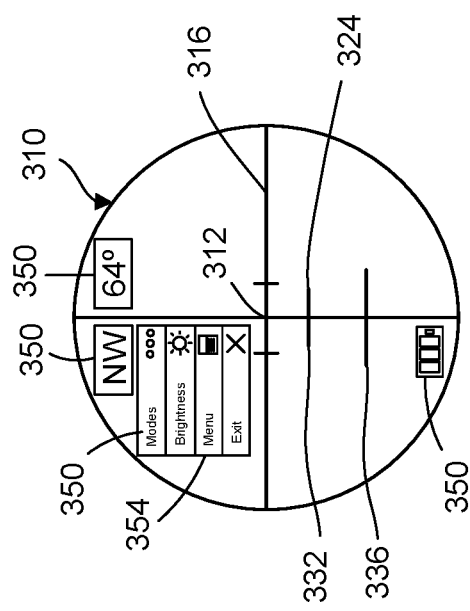

PATTERN CONFIGURABLE RETICLE

CROSS-REFERENCE TO RELATED APPLICATIONS

This application is a continuation-in-part of U.S. application Ser. No. 15/608,617, filed May 30, 2017, which claims the benefit of U.S. Provisional Application No. 62/342,485, filed May 27, 2016, both of which are incorporated by reference herein in their entireties.

FIELD OF THE DISCLOSURE

Embodiments of the disclosure are directed to an aiming device. Specifically, embodiments of the disclosure are directed to a system for reticle configuration in an aiming device, such as a rifle scope, thermal scope, smart scope, digital scope, or the like.

BACKGROUND

Many firearms, such as rifles, are equipped with an optical aiming device, such as a rifle scope, that provides the user with an image of an aligned aiming point or pattern (commonly known as a reticle) superimposed at the same focus as the target.

When shooting at long distances, shooters must adjust their aim to take into account the downward acceleration on the projectile imparted by gravity, which is often referred to as "bullet drop." In some instances, this is done by adjusting the angular position of the optics of the rifle scope relative to the rifle barrel using an elevation turret. Similarly, a shooter may also adjust for left-to-right movement due to wind using a windage turret.

Additionally, the optical aiming device can be outfitted with a ballistic drop compensation ("BDC") reticle that includes a reticle pattern for assisting a shooter to predict bullet drop at various ranges. The reticle can include a pattern with several different holdover marks stacked vertically beneath a central dot or crosshair which represents a zero mark. As such, when a firearm is zeroed to a certain range at the central crosshair, the stacked holdover marks will correspond to the bullet's impact at longer ranges. Accordingly, a shooter can choose an aiming point corresponding to one of the holdover marks or a point in between.

Humidity, elevation, temperature, grain size, bullet velocity and other various factors affect the flight of a bullet and the amount of bullet drop. As such, fixed-position BDC holdover marks do not consistently represent ranges. Furthermore, depending upon the above factors, the ranges represented can vary significantly, requiring calibration and experience for a shooter to accurately predict bullet drop and to use the BDC reticle.

Previous attempts to provide a BDC reticle are shown and described in U.S. Pat. Nos.: 7,703,679; 6,269,581; and in U.S. Pub. No. 2015/0247702; each incorporated by reference herein in their entirety.

SUMMARY

One or more embodiments of the disclosure are directed to an optical aiming device including a configurable ballistic drop compensation (BDC) reticle. In various embodiments, the reticle includes a BDC pattern, including one or more BDC holdover marks, that is configurable based on a plurality of weapon and ammunition pairings. For example, one or more embodiments of the disclosure provide for customizable placement of BDC holdover marks in a reticle pattern, where the placement corresponds to user-selected ranges or impact points for a particular weapon and ammunition pairing. In various embodiments, the positions of the BDC holdover marks in the reticle pattern are based on a determined ballistic trajectory path for the particular weapon and ammunition pairing.

Accordingly, various embodiments improve shooter accuracy at range, as the BDC pattern is specifically configured to indicate user designated ranges for the particular weapon and ammunition pair. This provides an improvement compared to BDC reticles with a static BDC pattern, as the static pattern may include holdover marks that are not positioned based on the gun and cartridge combination for which the optical aiming device is being used. Instead, if a user desires that the holdover marks in the static BDC pattern correspond to one or more specific ranges, the reticle may need to be designed based on that particular weapon and ammunition pair.

Additionally, one or more embodiments improve scope utility by allowing for various configurable BDC patterns for use with a plurality of different weapon and ammunition pairings. For example, for static BDC patterns, if the gun and/or ammunition changes, the holdover marks, which may be lines, of the pattern will have an entirely different meaning with regard to ranges. As such, the shooter would need to determine the new ranges indicated by the holdover marks, or utilize a reticle with a different BDC pattern. Similarly, if a user changes their preferences as to what ranges should be indicated by the BDC pattern, the reticle again would need to be replaced with one utilizing a different pattern.

Accordingly, one or more embodiments of the disclosure are directed to a system for configuring an optical aiming device for ballistic drop compensation (BDC). In one or more embodiments the optical aiming device including a housing with a reticle pane defining a reticle display field viewable by a user and indicating a zero point. In certain embodiments the housing further includes a plurality of axially spaced lenses and defines an optical path therethrough. In one or more embodiments the system includes a display device configured to project an image generated from a display, a processor, and a non-transitory computer readable storage medium. In various embodiments the computer readable data storage medium including instructions executable by the processor to perform various functions or tasks. In certain embodiments, the instructions are executable to receive a first set of ballistics input data indicating at least a first type of ammunition, and determine, using the first set of ballistics input data, a BDC pattern including at least two holdover marks corresponding to at least two ranges along a ballistic trajectory of the first type of ammunition greater than a range indicated by the zero point. In various embodiments the instructions are executable to project, using the display device, the BDC pattern onto the reticle display field.

One or more embodiments of the disclosure are directed to a method of configuring an optical aiming device for ballistic drop compensation (BDC). In one or more embodiments the optical aiming device further includes a processor, a non-transitory computer readable storage medium coupled with the processor, and a first display device. In certain embodiments the method includes receiving a first set of ballistics input data indicating at least a first type of ammunition. In certain embodiments the method includes receiving a first user-selected range and a second user-selected range each indicating a range along a ballistic trajectory of the first type of ammunition greater than a range indicated by the zero point. In certain embodiments the method includes determining, using the first set of ballistics input data, a first BDC pattern including at least two holdover marks corresponding to the first and second user-selected ranges. In various embodiments the method includes projecting, using the first display device, the first BDC pattern onto the reticle display field. In various embodiments the method includes receiving, subsequent to projecting the first BDC pattern, a third user-selected range indicating a range along the ballistic trajectory of the first type of ammunition greater than the range indicated by the zero point. In various embodiments the method includes determining, using the first set of ballistics input data, a second BDC pattern including a holdover mark corresponding to the third user-selected range. And in one or more embodiments the method includes projecting, using the first display device, the second BDC pattern onto the reticle display field.

One or more embodiments are directed to an optical aiming device including a housing extending from a forward bell portion including an objective lens to a rearward eyepiece portion including an ocular lens. In various embodiments the optical aiming device further includes a reticle pane positioned in the optical path in one or more of a first and second focal plane, the reticle pane at least partially defining a reticle display field including a zero point and viewable by a user, a processor, and a non-transitory computer readable storage medium coupled with the processor.

In certain embodiments the optical aiming device further includes a first display device and a second display device, the first display device positioned in the housing between one of the ocular lens and the second focal plane, and the objective lens and the first focal plane, and the second display device is positioned in the housing between the other of the ocular lens and the second focal plane, and the objective lens and the first focal plane.

In various embodiments the computer readable storage medium includes instructions, executable by the processor, to cause the optical aiming device to determine a ballistic trajectory for a first ammunition, determine, using the ballistic trajectory, a BDC pattern including at least two holdover marks corresponding to at least two ranges along the ballistic trajectory greater than a range indicated by the zero point, project, using the first display, the BDC pattern onto the reticle display field, and project, using the second display device, one or more of status indicators displaying system information, environmental information, time information and orientation information onto the reticle display field.

One or more embodiments of the disclosure are directed to systems, methods, and devices for configuring a reticle display field of an aiming device. In various embodiments, the aiming device including a housing defining an objective portion and an eyepiece portion. In such embodiments the aiming device configured to present a down-range image and the reticle display field through the eyepiece portion and is configurable between a plurality of magnification settings for magnifying the down-range image to a user.

In one or more embodiments the device includes a display device, a magnification sensor, a processor, and a non-transitory computer readable storage medium. In various embodiments the display device is configured to display a digital reticle image in the reticle display field, the digital reticle image including a first digital reticle portion. In one or more embodiments the magnification sensor is configured to produce an output signal that indicates a magnification setting for the aiming device. In various embodiments the non-transitory computer readable storage medium includes instructions executable by the processor.

In one or more embodiments the instructions are executable to cause the processor to receive a first output signal from the magnification sensor, the first output signal corresponding to a first magnification setting for the aiming device. In one or more embodiments the instructions are executable to cause the processor to determine, using the first output signal, the first magnification setting and to determine an expected engagement range for the first magnification setting and an expected engagement range for the first digital reticle portion.

In one or more embodiments the instructions are executable to cause the processor to determine that the expected engagement range of the first digital reticle portion and the expected engagement range of the first magnification setting at least partially overlap. In one or more embodiments the instructions are executable to cause the processor to, in response to determining that the expected engagement range of the first digital reticle portion and the expected engagement range of the first magnification setting at least partially overlap, display, using the display device, the first digital reticle portion in the reticle display field.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIGS. 3A-3E depicts reticle display fields, according to one or more embodiments of the disclosure.

Figure 1A:
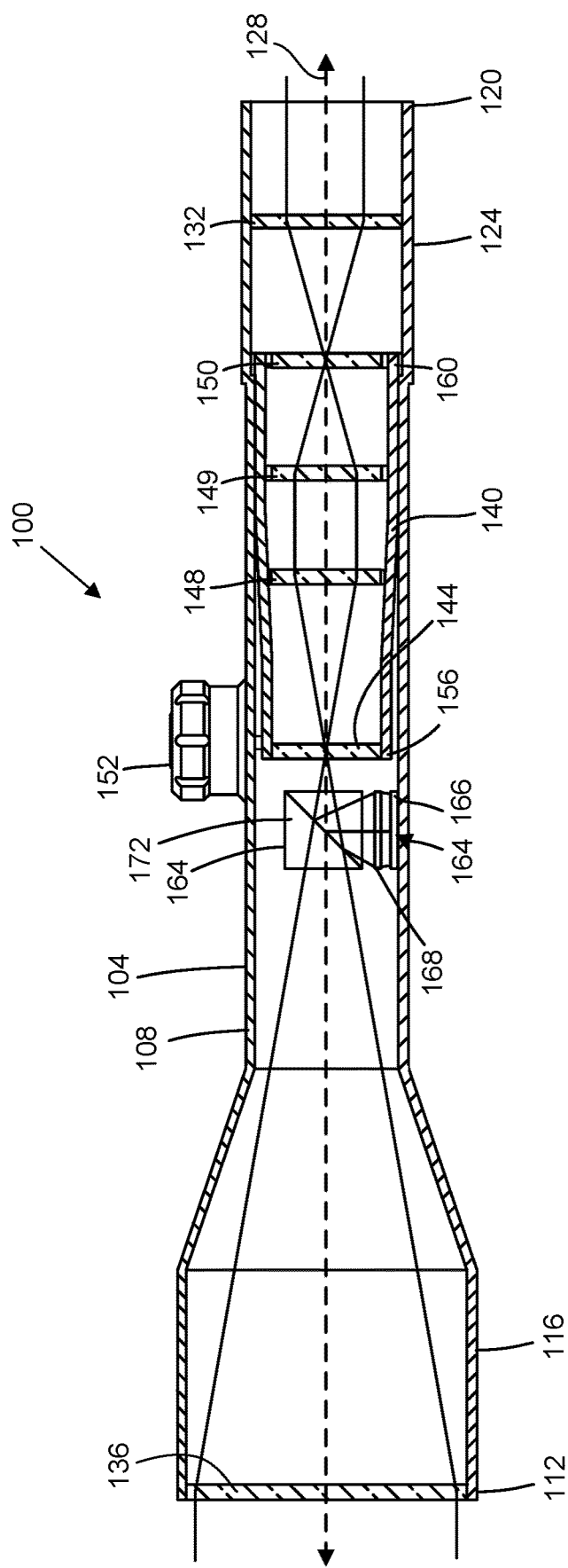
FIG. 1A-1B depict a cross-sections of an optical aiming device, according to one or more embodiments of the disclosure.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

FIG. 1A depicts an ocular aiming device 100 according to one or more embodiments. In various embodiments, the ocular aiming device 100 includes a housing 104 formed from an exterior tube 108. In certain embodiments, the housing 104 extends between a forward portion 112 that defines a bell portion 116 and a rearward portion 120 that defines an eyepiece portion 124. In one or more embodiments, the housing 104 is generally tubular shaped and defines an optical passageway for light to pass therethrough, along a central axis 128. In certain embodiments, the device 100 includes an ocular lens 132 positioned in the eyepiece portion 124 and an objective lens 136 positioned in the bell portion 116. In one or more embodiments, the device 100 includes an erector tube 140 mounted internally in the device 100 and co-axial with the housing 104.

In various embodiments, the erector tube 140 includes a reticle pane 144 and one or more axially spaced erector lenses 148, 149, 150, mounted within for magnification and creation of a reticle display field in the optical pathway. As used herein, reticle display field refers to a reticle and various other indicators or marks that are visible to a user when viewing through the optical aiming device. In one or more embodiments the erector tube 140 is connected to the exterior tube 108 via a pivoting frame for adjustments to the angle of the erector tube 140 relative to the housing 104 for elevation and windage adjustments. Accordingly, in certain embodiments the device 100 additionally includes an elevation adjust knob or turret 152 and a windage adjust knob or turret (not shown) for pivoting the erector tube 140 for such adjustments.

The reticle pane 144 is a pane or lens of transparent material that is viewable in the device 100 by a shooter through the ocular lens 132. In various embodiments, the reticle pane 144 includes a reticle or pattern for directing the aim of a shooter. When viewed through the device 100 a shooter will observe a reticle display field, defined at least in part by the reticle pane 144, which includes the reticle or pattern. For example, in various embodiments the reticle pane 144 includes a physical reticle of two etched lines, wires, or the like, that form a crosshair in the reticle display field and form a portion of the reticle. Described further herein, in some embodiments, reticle pane 144 is blank and has a digitally projected reticle or pattern that is reflected onto the reticle pane 144 to form a crosshair, or other suitable aiming mark in the reticle display field.

Depicted in FIG. 1A, the reticle pane 144 is positioned in the first focal plane, at a forward portion 156 of the erector tube 140. However, in certain embodiments, the erector lens 150 could instead be configured as a reticle pane, such that the reticle pane is positioned in the second focal plane at the rearward portion 160 of the erector tube 140. In some embodiments, the erector tube 140 can include multiple reticle panes positioned at both the forward portion 156 and at the rearward portion 160 of the erector tube 140. As such, described further below, in various embodiments the In various embodiments, the device 100 includes a display device 164 for projecting a digital image onto the reticle pane 144. In one or more embodiments, display device 164 includes a display 166, lens 168 and a prism 172 positioned internally within the housing 104. As used herein, prism 172 refers to a glass or other transparent object in prism form. In some embodiments, prism includes a transparent object including two or more refracting surfaces at an acute angle with each other. In some embodiments, prism 172 is a beam splitter. For example, in certain embodiments, prism 172 is a dielectric mirror, beam splitter cube, coated mirror, reflective surface or other suitable type of beam splitter.

In one or more embodiments, the display 166 is any suitable type of display device including, but not limited to, an organic light emitting display (OLED), a standard light emitting diode (LED) display, a liquid crystal display (LCD), and a digital micro-mirror display. In certain embodiments, display device 164 can be any combination of devices for projecting an image onto the reticle pane 144.

Depicted in FIG. 1A, display device 164 is positioned within the housing 104 and in the optical pathway such that at least some portion of the incoming light from the objective lens 136 passes through the prism 172. In some embodiments, the prism 172 display device 164 is fully transparent such that the display device 164 does not significantly obscure or block the light passing through the prism 172. Further, while FIG. 1A depicts the display device 164 as being positioned in the optical pathway, in some embodiments, display device 164 is offset from the optical pathway such incoming light does not interact with the prism 172 or other display device 164 elements.

The size of the prism 172 and display device 164, relative to the housing 104 and the optical pathway within the device 100, as depicted in FIG. 1A are for clarity rather than an actual depiction of the relative sizes of the components. As such, in various embodiments, the size of the prism 172 and other components of the display device 164 could be larger or smaller relative to the size of the housing, the optical pathway, and other elements of the device 100.

In operation, in one or more embodiments, the display 166 emits an output image for projection onto the reticle pane 144 to define the reticle display field. The lens 168 focuses the output image toward the prism 172, which is reflected and projected upon the reticle pane 144, modifying the reticle display field to include the output image. As such, when a user views the reticle pane 144, the output image appears overlaid onto the original reticle pattern. Accordingly, and described further in FIG. 3, the reticle pattern is customizable based on the emitted image from the display 164.

Figure 2:
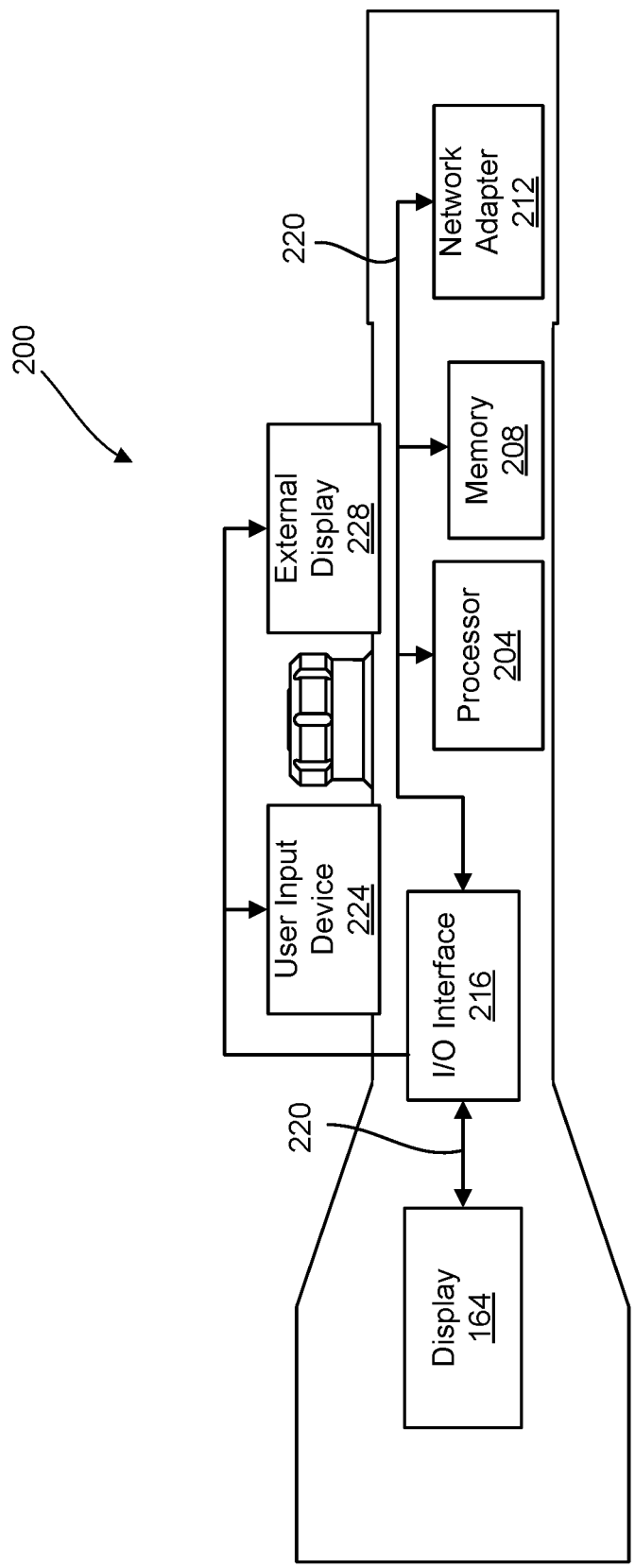
FIG. 2 depicts a system architecture view of an optical aiming device, according to one or more embodiments of the disclosure.

Described further with reference to FIG. 2, in various embodiments, the display device 164 is communicatively coupled with various electronic circuitry for control of the display device 164. In certain embodiments, the housing 104 will provide the necessary space for mounting the electronic circuitry, as well a portable power supply for generating and projecting images onto the reticle pane 144. However, in certain embodiments, some or all of the electronic circuity is mounted externally to the housing 104.

FIG. 1A depicts the display device 164 positioned in the housing 104 forward of the reticle pane 144, positioned between the objective lens 136 and the erector tube 140. As a result, in various embodiments, the image or reticle pattern projected onto the reticle pane 144 by the display 166 and prism 172 is magnified by the erector lenses 148, 149, 150. In addition, FIG. 1A depicts a single display device 164 positioned in the housing 104. However, in various embodiments, the device 100 could include two or more display devices and/or a display device positioned rearwardly in the housing, between the erector tube 140 and the ocular lens 132.

Figure 1B:
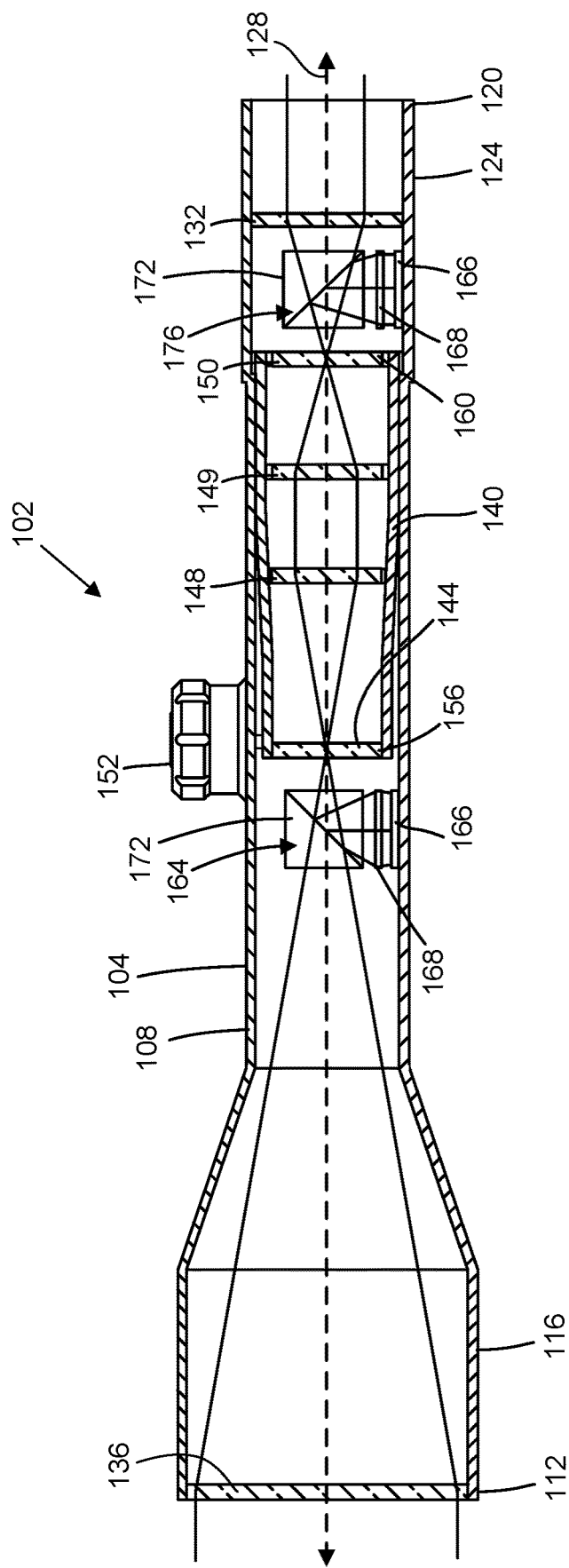

For example, referring to FIG. 1B, an ocular aiming device 102 is depicted, according to one or more embodiments. In various embodiments, the ocular aiming device 102 is substantially similar to ocular aiming device 100 in FIG. 1A, and includes a housing 104, ocular lens 132 positioned in the eyepiece portion 124, an objective lens 136 positioned in the bell portion 116, and an erector tube 140 including reticle pane 144 and erector lenses 148, 149, 150. In various embodiments, ocular aiming device 102 includes a first display device 164 and a second display device 176. Second display device 176 is substantially the same as first display device 164, including a display 166, lens 168 and prism 172 configured to project an image from the display 166 onto the reticle pane 144. As a result, in certain embodiments, the reticle pane 144 can include two or more overlapping images each projected by different display devices, allowing for more complex reticle patterns or images. In various embodiments, the second display device 176 is positioned rearwardly in the housing 104, between the erector tube 140 and the ocular lens 132 and is configured to project an image onto the second reticle pane, onto the erector lens 150. As a result, in various embodiments, the image projected onto the erector lens 150 by the display 166 is left un-magnified. This configuration can be particularly helpful when the display device 176 is projecting text or other information or where certain portions of the projected image are preferred not to be magnified.

While FIGS. 1A-1B depicts the ocular aiming device 100, 102 as a rifle scope or telescopic sight, in certain embodiments, the ocular aiming device 100, 102 could be any type of suitable sighting device. For example, the optical aiming device 100, 102 could be a reflex sight, holographic sight, digital scope, or other type of sighting device.

FIG. 2 depicts a system architecture for electronic circuitry in an optical aiming device 200, according to one or more embodiments of the disclosure. In various embodiments, optical aiming device 200 is the same or substantially similar as optical aiming device 100 depicted in FIG. 1. The electronic circuitry of the optical aiming device 200 includes a processor 204, a memory 208, network adaptor 212, input/output (I/O) interface 216, display 164, and a bus 220 that communicatively couples various system components.

Processor 204 is a collection of one or more logical cores or units for receiving and executing instructions or programs. For example, in one or more embodiments, processor 204 is configured to receive and execute various routines, programs, objects, components, logic, data structures, and so on to perform particular tasks or implement particular abstract data types.

Memory 208, is a collection of various computer-readable media in the system architecture. In various embodiments, memory 208 can include, but is not limited to volatile media, non-volatile media, removable media, and non-removable media. For example, in one or more embodiments, memory 208 can include random access memory (RAM), cache memory, read only memory (ROM), flash memory, solid state memory, or other suitable type of memory. In one or more embodiments, memory 208 includes any media that is accessible to the electronic circuitry in the optical aiming device 200. For example, in some embodiments, memory 208 includes computer readable media located locally in the optical aiming device 200 and/or media located remotely to the optical aiming device 200 and accessible via a network.

In certain embodiments, further described with reference to FIG. 5, memory 208 includes at least one program product having a group of one or more logical instructions that are executable by the processor 204 to carry out the functions of the various embodiments of the disclosure.

Bus 220 represents one or more of any of suitable type of bus structures for communicatively connecting the electronic circuitry of the device 200. In various embodiments the bus 220 includes a memory bus or memory controller, a peripheral bus, and a processor or local bus using any of a variety of bus architectures.

In various embodiments, the I/O interface 216 facilities communication between the various components of the electronic circuitry. For example, in one or more embodiments, I/O interface 216 is communicatively coupled with the display 164, processor 204 and memory 208 for emitting an output image via the display 164. For example, in certain embodiments, the processor 204 generates an output that corresponds to a particular BDC pattern. The processor 204 can transmit this output the I/O interface 216 which can then translate the processor output into instructions which are compatible with the display 164 and which result in the display 164 emitting an image corresponding to the BDC pattern.

In certain embodiments the I/O interface 216 facilitates communication with input and output devices for interacting with a user. For example, I/O interface 216 can communicate with one or more devices such, as a user-input device 224 and/or an external display 228, which enable a user to interact directly with the device 200. User-input device 224 may comprise a keyboard, one or more push-buttons, a touch screen, or other devices that allows a user to input information. External display 228 may comprise any of a variety of visual displays, such as a viewable screen, a set of viewable symbols or numbers, and so on.

In one or more embodiments, network adaptor 212 enables communication with one or more external computing devices via one or more network protocols. For example, in various embodiments, optical aiming device 200 can communicate using one or more networks such as a local area network (LAN), a general wide area network (WAN), and/or a public network (e.g., the Internet) via network adapter 212. In certain embodiments, network adaptor 212 communicates wirelessly, transmitting and receiving data over air. For example, in certain embodiments network adapter 212 can communicate using Wi-Fi, BLU- ETOOTH®, or other suitable form of wireless communication. In some embodiments network adapter 212 can communicate to an external computing device via a wired connection.

FIG. 2 is only one example of a suitable system and is not intended to suggest any limitation as to the scope of use or functionality of the embodiments described herein. Regardless, the depicted system architecture is capable of being implemented and/or performing the functionality as set forth herein.

Referring to FIGS. 3A-3E, a variety of reticle display fields 300, 304, 308, 309, 310 are depicted, according to one or more embodiments of the disclosure. In various embodiments, each of the reticle display fields 300, 304, 308, 309, 310, include a BDC pattern reticle 300a, 300b, 300c having a crosshairs with intersecting horizontal line 316 and vertical line 320. The horizontal line 316 and vertical line 320 intersect to form a central zero mark 312 which denotes a zero point. The zero point is determined when sighting a firearm at a known distance by adjusting the angular position of an optical aiming device relative to the barrel of a firearm until the impact point of a fired projectile matches the zero point on the reticle display field 300, 304, 308 309, 310. Consequently, the zero point indicates a first known distance or range.

To target ranges greater than the first known distance, a shooter may adjust the elevation of the scope, thus changing the zero point, or simply shift aim vertically to adjust for bullet drop at ranges beyond the first known distance. For example, in certain embodiments, the reticle display fields 300, 304, 308, 309, 310 each include a plurality of BDC holdover marks 324. The BDC holdover marks 324 provide a visual indication of a vertical shift required to fire a projectile at a range beyond the zero point. In some embodiments, the reticle display fields 300, 304, 308, 309, 310 also include a plurality of windage adjustment marks 328. Windage adjustment marks provide visual indications of lateral shift for compensating for deflecting crosswinds.

In various embodiments, some or all of the lines in the reticle display field 300, 304, 308, 309, 310 are generated or projected upon a reticle pane by a display. For example, the one or more of the horizontal line 316, vertical line 320, BDC holdover marks 324, and windage adjustment marks 328 could be projected upon a reticle pane via a display, such as display device 164 described with reference to FIGS. 1 and 2.

Accordingly, in one or more embodiments, the reticle display field 300, 304, 308, 309, 310 is entirely customizable. For example, instead of a crosshairs, zero mark 312 could be displayed as a duplex reticle, target dot, MILDOT, circle dot, or other suitable type of reticle. Similarly, in various embodiments, the BDC holdover marks 324 and/or windage adjustment marks 328 can be moved, removed, added, or have other modifications based on the output image of a display.

Accordingly, FIGS. 3A-3E depict configurable reticle display field 300, 304, 308, 309, 310 that include projected BDC holdover marks 324 and/or windage adjustment marks 328, according to one or more embodiments of the disclosure.

Figure 3B:
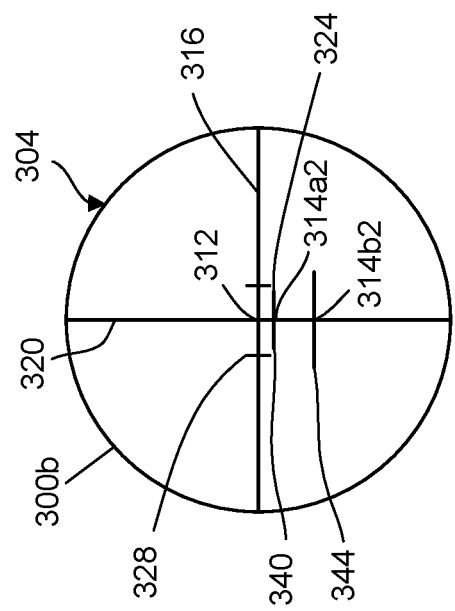
Figure 3C:
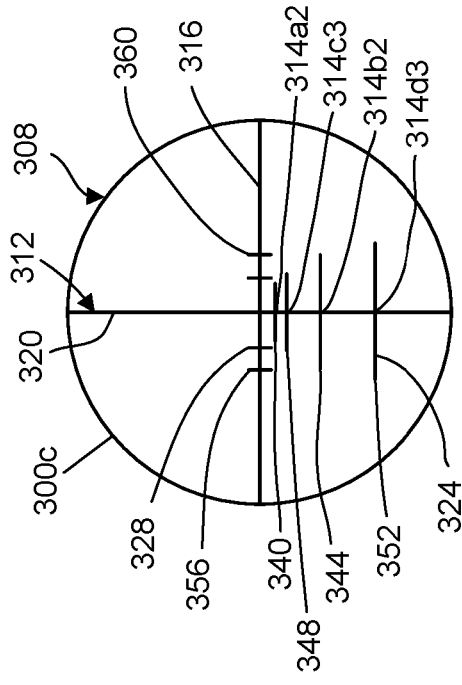
Figure 3A:
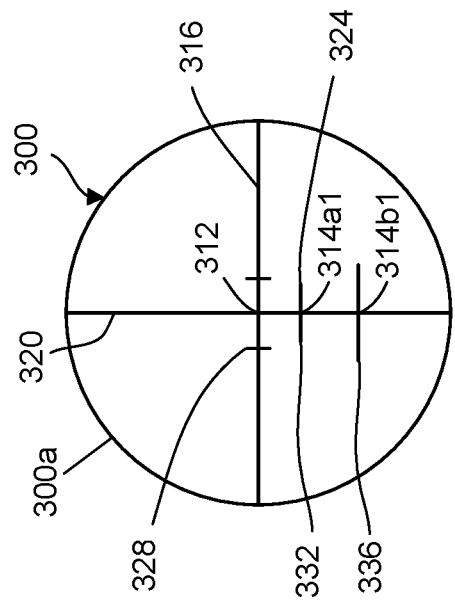

FIG. 3A depicts BDC holdover marks 324 including a first holdover mark 332 and a second holdover mark 336. The first holdover mark 332 and second holdover mark 336 can be set to indicate various ranges that are greater than the range of the zero point in order to compensate for bullet drop. In various embodiments, the first and second holdover marks 332, 336 include holdover points 314a1, 314b1. The holdover points 314a1, 314b1 are points of intersection between vertical line 320 and holdover marks 332, 336. As such, holdover points 314a1, 314b1 denote aiming points for firing at the ranges indicated by the holdover marks 332, 336.

In various embodiments, these ranges are user-selected. For purpose of example, the first holdover mark 332 could be user-selected to indicate a range of two-hundred yards while the second holdover mark 336 could be user-selected to indicate a range of four-hundred yards. In one or more embodiments, the position of the first and second holdover marks 332, 336 is based on a ballistic trajectory determined from ballistics data for a particular weapon and ammunition combination. For example, in one or more embodiments a first type of ammunition and a first type of weapon will generate BDC holdover marks 324 in FIG. 3A.

FIG. 3B depicts a reticle display field 304 including BDC holdover marks 340, 344 positioned based on a second ballistic trajectory. The second ballistic trajectory is different from the first ballistic trajectory as a result in a change in ballistics data. For example, the ballistics data could change as a result of a change in the type of ammunition, weapon, or due to other factors such as altitude, humidity, temperature, and air density. Holdover marks 340, 344 indicate the same ranges as holdover marks 332, 336 depicted in FIG. 3A (two-hundred yards and four-hundred yards). However, due to the change in the ballistic trajectory, the position of holdover marks 340, 344 has been altered to accommodate or new bullet drop compensation. Similarly as with FIG. 3A, holdover marks 340, 344 include holdover points 314a2, 314b2, denoting the points of aim for firing a projectile at the ranges indicated by the holdover marks 340, 344.

In one or more embodiments, the holdover marks of various BDC patterns, for example, the marks of FIG. 3A and the marks of FIG. 3B are displayed concurrently. As such, in certain embodiments, the reticle display field can include one or more BDC patterns simultaneously to facilitate quick changes of ammunition without the need to reconfigure the reticle, or for other reasons. In various embodiments different BDC patterns can be differentiated in the reticle display field by using a separate display color for each of the BDC patterns.

In FIG. 3C the BDC holdover marks 340, 344 are substantially the same as in FIG. 3B, and again indicate ranges of two-hundred and four-hundred yards. BDC holdover marks 348, 352 are added to the pattern 308, indicating additional ranges along the second ballistic trajectory. For example, BDC holdover marks 348, 352 could indicate yardage of three-hundred yards, and six-hundred yards, respectively. Similarly with regard to FIG. 3B, holdover marks 348, 352, include holdover points 314c3, 314d3, denoting the points of aim for firing a projectile at the range indicated by the holdover marks 348, 352.

In addition windage adjustment marks 356, 360 have been added to the reticle pattern 308. In various embodiments, additional BDC holdover marks 348, 352 and additional windage adjustment marks 356, 360 are added to the reticle display field 308 in response to receiving input from a user requesting additional range indications. Furthermore, in some embodiments, the holdover marks 340, 344 can be modified to indicate various other ranges at any time in response to user input. For example, holdover marks 340, 344 could be modified to indicate one-hundred and twenty five yards, and one hundred and fifty yards, respectively, or any other suitable range along the second ballistic trajectory.

FIGS. 3D-3E depict BDC holdover marks 324 including a first holdover mark 332 and a second holdover mark 336.

However, in addition, FIGS. 3D-3E include a variety of status indicators 350, projected onto the physical reticle pane. In various embodiments, each of the status indicators 350 include various environmental information, orientation information, and/or system information such as battery life, display settings, other settings, or other various indicators for a user.

For example, referring to FIG. 3E, the reticle display field can have a user options menu 354 displayed for user selection/configuration of the system for BDC while looking down scope. The menu 354 includes various text options along with a number of icons for changing/configuring various settings. As such, in various embodiments, the user make various settings adjustments or otherwise configure the scope reticle while minimizing movements and/or potential nose. In various embodiments, the menu 354 and other various status indicators 350 are projected onto the second reticle plane, such that the menu 354 and other indicators 350 are not subject to magnification or other image modification that might distort the displayed image or make the image unreadable for a user.

Figure 4:
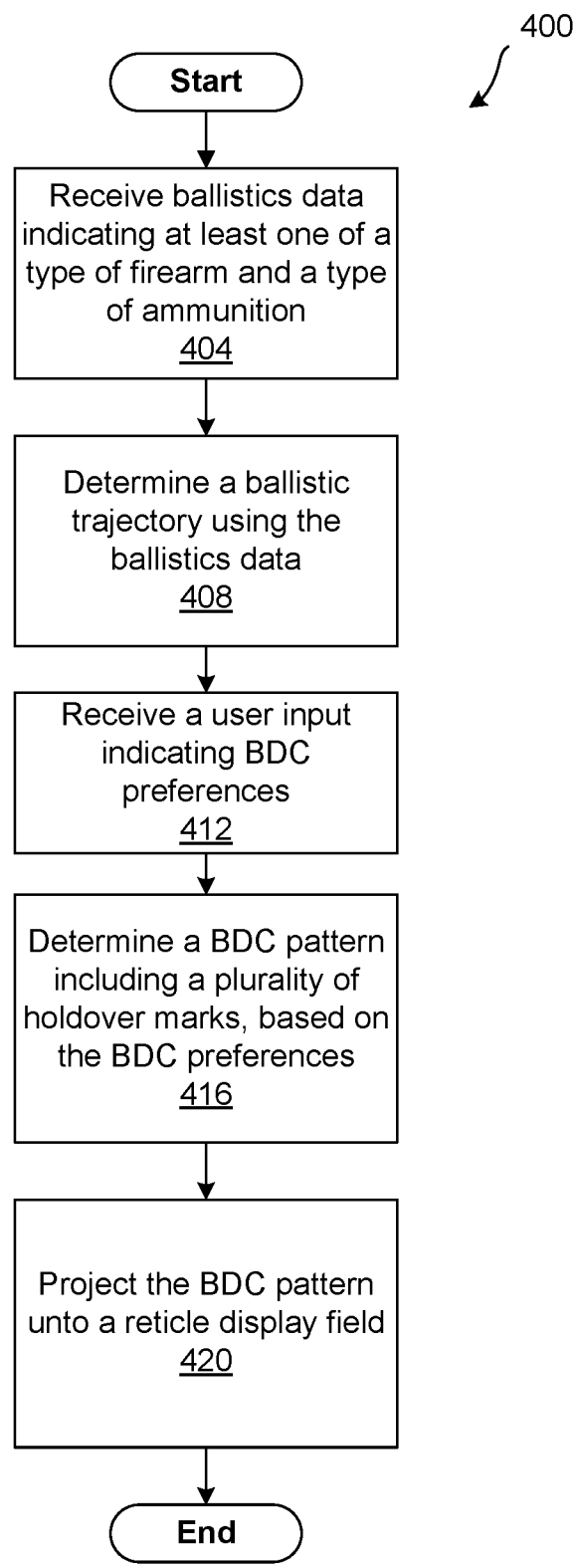
FIG. 4 depicts a flowchart diagram of a method for configuring an optical aiming device for ballistic drop compensation (BDC), according to one or more embodiments of the disclosure.

FIG. 4 depicts a flowchart diagram of a method 400 of configuring a reticle in an optical aiming device for BDC. In various embodiments, the method 40 is implemented with an optical aiming device such as optical aiming device 100, 200 depicted in FIGS. 1 and 2. In some embodiments, method 400 is implemented in a larger system, described further with reference to FIG. 5.

In one or more embodiments, in operation 404, the method 400 includes receiving ballistics data. Ballistics data is a collection of various types of data which affect a ballistic trajectory for a firearm and ammunition. Accordingly, in various embodiments, the ballistics data includes a type of ammunition, a type of firearm, and/or other factors such as altitude, humidity, temperature, and air density. In certain embodiments, the type of ammunition includes information about the characteristics of the ammunition including grain, the amount of powder, caliber of the round, and other information. In some embodiments, the type of firearm includes information about the characteristics of the firearm including barrel length, caliber, compatible ammunition, and other information.

In certain embodiments, in operation 408, method 400 includes determining a ballistic trajectory using the ballistics data. The ballistic trajectory is a path or estimated path that a projectile will take under the effect of gravity. In some embodiments, the ballistic trajectory can additionally include other forces on the projectile, such as aerodynamic drag and friction. In various embodiments, the ballistic trajectory is determined based on a set of calculations performed in response to receiving the ballistics data. In some embodiments, the ballistic trajectory is determined by looking up a predetermined trajectory that matches with the received ballistics data, for example, stored in a lookup table in computer memory.

In some embodiments, in operation 412, the method 400 includes receiving one or more user inputs indicating BDC preferences. In various embodiments, a user submits preferences regarding the number of BDC holdover marks, ranges indicated by the BDC holdover marks, the design of the zero mark, windage marks, or other information. In response, in one or more embodiments, in operation 416, the method 400 includes determining a BDC pattern including a plurality of holdover marks indicating ranges along the ballistic trajectory, based on the user BDC preferences.

In various embodiments, in operation 420, the method 400 includes projecting the BDC pattern onto a reticle display field. In various embodiments, the BDC pattern is projected onto the reticle display field in substantially the same manner as described above with reference to FIGS. 1 and 2.

Figure 5:
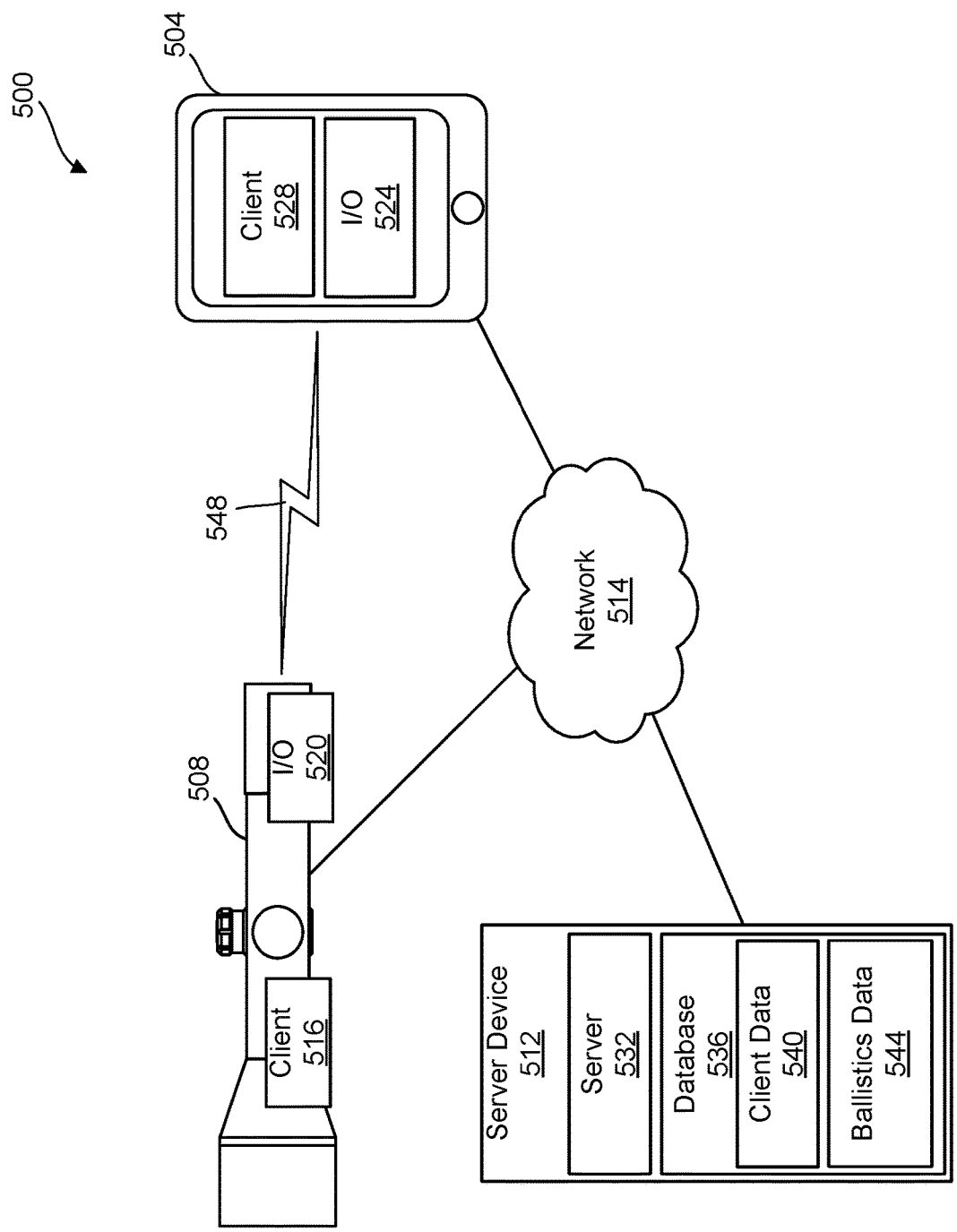
FIG. 5 depicts a system for configuring an optical aiming device for BDC, according to one or more embodiments of the disclosure.

Referring to FIG. 5, a system 500 for configuring a reticle pattern for BDC is depicted, according to one or more embodiments of the present disclosure. In one or more embodiments, the system 500 includes a client device 504, an optical aiming device 508, and a server device 512, interconnected via a network 514. In one or more embodiments, optical aiming device 508 is the same or substantially similar as optical aiming device 200 depicted in FIG. 2. Accordingly, in various embodiments, optical aiming device 508 includes one or more processing elements and memory for storing and/or executing instructions or software. For example, in one or more embodiments, optical aiming device 508 includes client software 516.

Client software 516 is a set of logical instructions that are stored in memory accessible to the optical aiming device 508 for execution by its processing elements. Described further herein, in various embodiments, client software 516 is BDC reticle configuration software configured to perform one or more embodiments of the disclosure. Additionally, in certain embodiments, optical aiming device 508 includes input/output devices 520 for interfacing with a user. For example, optical aiming device 508 can include a display, keyboard, touchscreen, or other suitable user interface for receiving commands and outputting data to users.

The client device 504 is a physical computing device, usable by a consumer or other user, including memory and one or more processing elements for storing and/or executing instructions or software. For example, in one or more embodiments the client device 504 is a mobile computing device such as a tablet, smart phone, wearable computer, or other suitable mobile device. In some embodiments, the client device 504 is a more general computing device such as, for example, a laptop computer, desktop computer, or other computing device.

In one or more embodiments, the client device 504 includes input/output devices 524 for interfacing with a user. For example, client device 504 can include a display and/or touchscreen and a graphical user interface (GUI) for receiving commands and outputting data to users.

The client device 504 includes client software 528. Client software 528 is a set of logical instructions that are stored in memory accessible to the client device 504 for execution by processing elements. In certain embodiments, client software 528 is stored locally on the client device 504. In some embodiments, client software 528 is stored remotely and is accessible to the client device 504 via network 514.

In one or more embodiments client software 528 allows a user to configure various settings for the BDC system 500 via the input/output devices 524. For example, in one or more embodiment client software 528 allows a user to select or configure the reticle or BDC pattern or various holdover marks displayed by the optical aiming device 508. In certain embodiments client software 528 allows the user to create custom, user designed reticles for display in the optical aiming device 508. For example, in certain embodiments, client software 528 includes various design tools such that a user can interface with the software via input/output devices 524 to create, design, or modify various reticle patterns. In one or more embodiments the client device 504 includes a library or database of stored reticle patterns in local memory or stored remotely in memory accessible to the client device 508 via the network 514 or another network, such as for example a public network (e.g. the internet).

The server device 512 is a computing device including memory and one or more processing elements for storing and/or executing instructions or software. Server device 512 includes server software 532. Server software 532 is a set of logical instructions stored in memory accessible to the server device for execution by processing elements.

In one or more embodiments, server device 512 includes a database 536 including client data 540 and ballistics data 544. Client data 540 includes various information corresponding to the client device 504 and/or a user. For example, client data 540 can include user account information, and various other data related to the user.

Ballistics data 544 includes a collection of various firearm data and ammunition data for determining ballistic trajectories. For example in one or more embodiments, ballistics data includes data for various firearms including compatible ammunition, caliber, barrel length, and other firearm characteristics. In some embodiments the ballistics data includes data for various ammunition types and characteristics, such as gain size and powder.

In one or more embodiments, client device 504, optical aiming device 508, and server device 512 are interconnected via network 514, for communication of data between the elements in the system 500. In one or more embodiments, the network 514 may be, for example, a local area network, a wide area network, a cloud computing environment, a public network (e.g. the internet), or other suitable network for communication between the elements in the system 500. In certain embodiments, optical aiming device 508 and client device 504 are directly connected via a wireless connection 548. For example, in certain embodiments a network adapter can communicate using Wi-Fi, BLUETOOTH®, or other suitable type of wireless communication. In some embodiments, optical aiming device 508 and client device 504 are directly connected via a wired connection.

In some embodiments, client device 504 and server device 512 are a single device that includes both client software 528 and server software 532. For example, client device 504 and server device 512 could be configured in a single seat setup, networked with client software 516 located in optical aiming device 508. In some embodiments, client device 504, server device 512, and optical aiming device 508 are a single device that includes client software 516, 528, and server software 532.

In operation, system 500 is configured to perform one or more embodiments of the disclosure. In some embodiments, system 500 is configured to execute a method, such as method 400 as described with reference to FIG. 4. For example, client device 504 can be configured to receive inputs from a user. In one or more embodiments, these inputs correspond to various types of ballistic data such as firearm type, ammunition type, and other type of ballistic data. Upon receiving these inputs, client device 504 and server device 512 can communicate to determine a ballistic trajectory.

In addition to receiving inputs corresponding to ballistic data, in one or more embodiments, client device can receive inputs regarding desired BDC ranges for display in the optical aiming device 508. Based on the desired BDC ranges, and the ballistic data, the client device 504 and server device 512 can communicate to determine a BDC pattern that includes a plurality of BDC holdover marks that indicate the desired ranges. After the BDC pattern is determined, client device 504 can communicate with the optical aiming device to project the determined pattern onto a reticle pane and upon the reticle display field.

Figure 6:
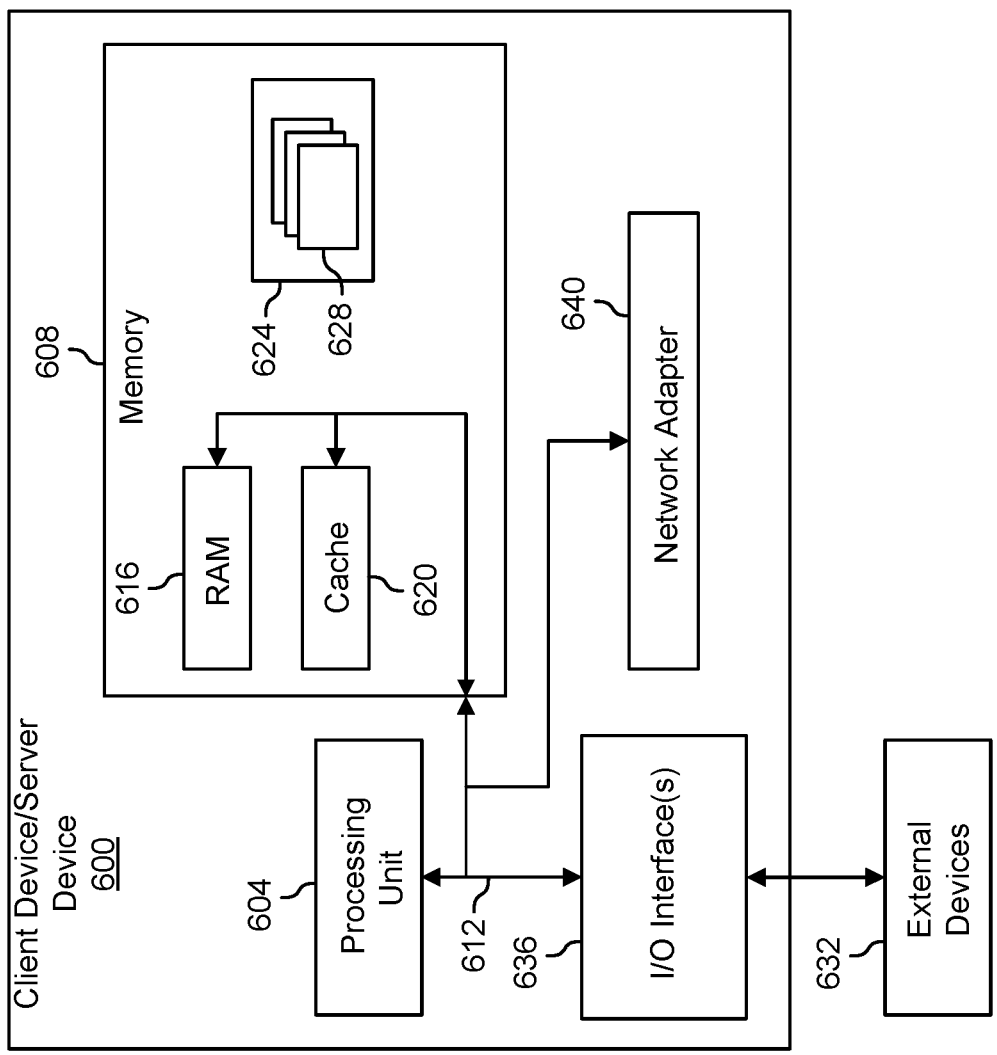
FIG. 6 depicts a system architecture view of a client device and/or service device for configuring an optical aiming device for BDC, according to one or more embodiments of the disclosure.

FIG. 6, depicts a block diagram of a client device/server device 600 for configuring a reticle for BDC, according to one or more embodiments. In various embodiments, client device/server device 600 is the same or substantially similar to client device 504 and/or server device 512 depicted in FIG. 5. Client device/server device 600 is only one example of a suitable system and is not intended to suggest any limitation as to the scope of use or functionality of the embodiments described herein.

In various embodiments, client device/server device 600 is operational with numerous other general purpose or special purpose computing system environments or configurations. Examples of well-known computing systems, environments, and/or configurations that may be suitable for use with client device/server device 600 include, but are not limited to, personal computer systems, server computer systems, handheld, mobile, or laptop devices, multiprocessor systems, microprocessor-based systems, distributed computing environments, or other suitable computing system.

Client device/server device 600 can be described in the general context of computer system, including executable instructions, such as program modules, being executed by a computer system. Generally, program modules can include routines, programs, objects, components, logic, data structures, and so on that perform particular tasks or implement particular abstract data types. In some embodiments, client device/server device 600 is practiced in distributed computing environments where tasks are performed by remote processing devices that are linked through a network. In a distributed computing environment, program modules are located in local and/or remote computer system storage media.

In one or more embodiments, client device/server device 600 includes one or more processors or processing units 604, a system memory 608, and a bus 612 that couples various system components including system memory 608 to processor 604.

In various embodiments, bus 612 represents one or more of any of several types of bus structures, including a memory bus or memory controller, a peripheral bus, and a processor or local bus using any of a variety of bus architectures. By way of example, and not limitation, such architectures can include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

In one or more embodiments, client device/server device 600 includes a variety of computer readable media. Such media is any available media that is accessible by client device/server device 600, including both volatile and non-volatile media, removable and non-removable media.

For example, in certain embodiments, system memory 608 can include computer readable media in the form of volatile memory, such as random access memory (RAM) 616 and/or cache memory 620. In various embodiments, memory 608 includes at least one program product having one or more program modules or instructions that are configured to carry out the functions of embodiments of the disclosure as described herein. As used herein, memory or other computer readable storage mediums are not to be construed as being transitory. As such, a computer readable storage medium refers to a physical non-transitory device.

For example, program 624 includes one or more program modules 628 that are stored in memory 608. Program modules 628 generally carry out the functions and/or methodologies of one or more of the embodiments described herein.

In one or more embodiments client device/server device 600 also communicates with one or more external devices 632 such as a keyboard, a pointing device, a display, etc. In certain embodiments, client device/server device 632 communicates with one or more devices that enable client device/server device 600 to communicate with one or more other computing devices (e.g., network card, modem, etc.). Such communication occurs via an input/output (I/O) interface 636. Additionally, in various embodiments, client device/server device 600 can communicate with one or more networks such as a local area network (LAN), a general wide area network (WAN), and/or a public network (e.g., the Internet) via network adapter 640.

Figure 7A:
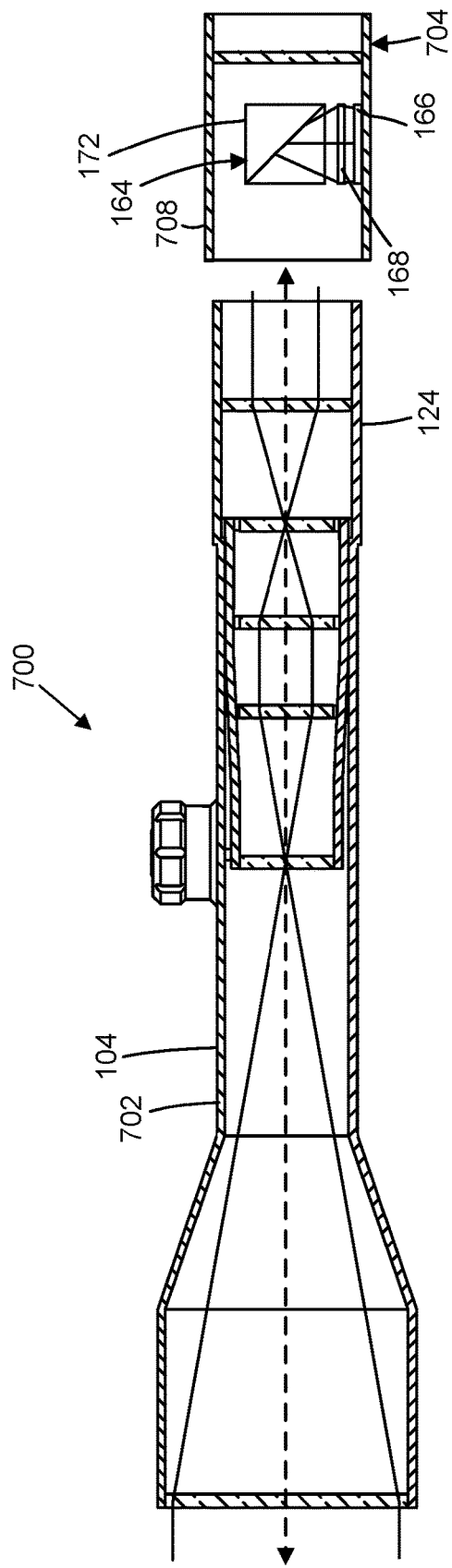
FIGS. 7A-7B depict stages of assembly of a system for configuring an optical aiming device for BDC, according to one or more embodiments of the disclosure.
Figure 7B:
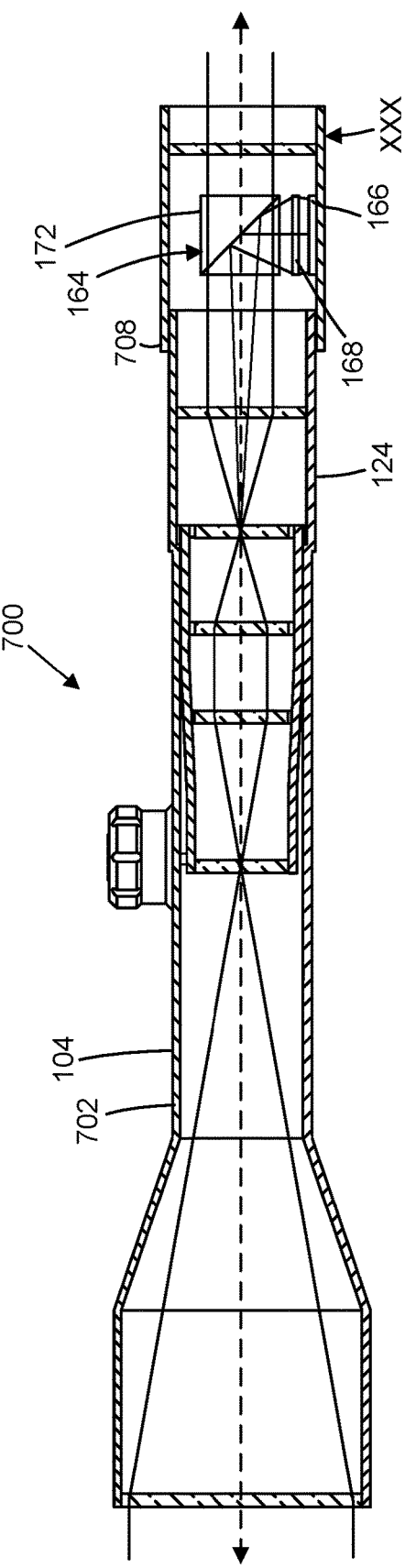

While FIGS. 1A-1B depict an optical aiming device 100, 102, that includes one or more display devices housed internally within a housing 104, in some embodiments, an attachable separate device can be attached to a typical optical aiming device to configure the device for BDC. For example, FIGS. 7A-7B depict stages of assembly of a system 700 for configuring an optical aiming device for BDC, according to one or more embodiments of the disclosure. In one or more embodiments, the system 700 includes an optical aiming device 702 and a BDC device 704.

In various embodiments, the BDC device 704 is separately attachable and/or removable to the optical aiming device 702 to configure the optical aiming device for BDC as described according to one or more of the embodiments above. In one or more embodiments the BDC device 704 includes a housing 708 or frame for attachment to the eyepiece 124 of the optical aiming device 702. In addition, the BDC device 702 includes a display device 164. Display device 164 is the same or substantially similar to display device 164 as described above, and includes. In various embodiments, housing 708 includes a processor, memory, power source, and other componentry for operation of the display device 164 according to one or more of the embodiments described above.

Figure 8:
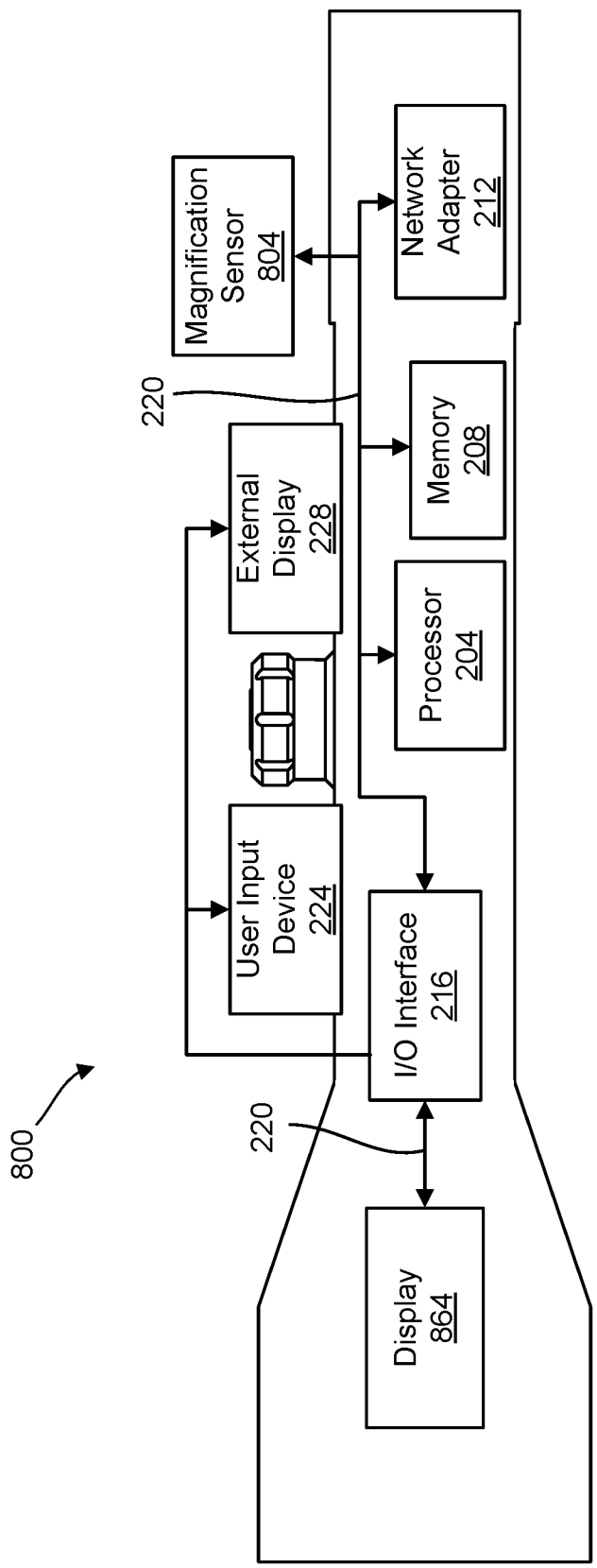
FIG. 8 depicts a system architecture for electronic circuitry in an optical aiming device, according to one or more embodiments of the disclosure.

Referring to FIG. 8 a system architecture for electronic circuitry in an optical aiming device 800 is depicted, according to one or more embodiments of the disclosure.

In various embodiments, optical aiming device 800 includes one or more components that are the same or substantially similar to the optical aiming device 200 depicted in FIG. 2 and like elements are referenced with the same reference numeral(s). For example, the optical aiming device 800 includes a processor 204, a memory 208, network adaptor 212, input/output (I/O) interface 216, a bus 220 that communicatively couples various system components, a user input device 224, and an external display 228.

In certain embodiments, further described with reference to FIGS. 10-12, memory 208 includes at least one program product having a group of one or more logical instructions that are executable by the processor 204 to carry out the functions of the various embodiments of the disclosure.

In one or more embodiments the optical device 800 includes a display device 864. In one or more embodiments, the display 864 is any suitable type of display device including, but not limited to, an organic light emitting display (OLED), a standard light emitting diode (LED) display, and a liquid crystal display (LCD). In certain embodiments, the display device 864 is substantially similar to display 164, and is configured to project the digital reticle image, via a beam splitter, into the reticle display field. In certain embodiments, the display device includes one or more LEDs mounted in the reticle pane, each of the one or more LEDs selectively energizable to form at least part of the digital reticle image. Additional examples of energizable LEDs can be found, for example, in U.S. Pat. No. 7,703,679, titled "Trajectory Compensating Sighting Device Systems and Methods", incorporated herein by reference. In certain embodiments, display device 864 can be any combination of devices for displaying a digital reticle image.

In one or more embodiments the optical device 800 includes a magnification sensor 804. The magnification sensor 804 is a device configured to provide one or more output signals that can be used, by the processor 204 or like device, to calculate, estimate, or otherwise determine a magnification setting of the optical device 800. In various embodiments the optical device 800 is configured to magnify a down-range image through an array of internal lenses and present the magnified image to a user through the eyepiece portion. In various embodiments the magnification of the down-range image is alterable between a plurality of various settings based on the configuration of the internal lenses.

For instance, in certain embodiments the optical device 800 could have a plurality of magnification settings including, for example, a 1×, 2×, 4×, 8×, and 16× magnification settings. However, the optical device 800 could be configured to have any suitable magnification setting as desired and allowed by the design of the internal elements of the device 800.

In such embodiments the sensor 804 will produce an identifiable output to the processor 204 that corresponds to the magnification setting such that the processor 204 is able to determine the magnification setting and the physical configuration of the internal components of the optical device 800 associated with each setting.

As such, and described further below, in various embodiments the optical device 800 can be configured for automatic alteration of the reticle display field in the device 800 based on the magnification settings of the device 800. In such embodiments, the device 800 can be configured to use the magnification setting to determine an expected engagement range for a target. In various embodiments each magnification setting of the device 800 is associated with an expected engagement range. For example, the device 800 could determine an expected engagement range that includes close-range targets, such as targets within 50 yards, based on a magnification setting of 3× or lower while determining an expected engagement range that excludes close-range targets at magnification settings of 4× or larger.

In various embodiments the device 800 can be configured to modify or otherwise alter a reticle image that is presented to a user based on the determined expected engagement range. For instance, in various embodiments the reticle image will have portions, such as close-range elements, long-range elements, or other elements, that are associated with a particular expected engagement range. In one or embodiments, the device 800 can be configured to automatically modify or otherwise alter a reticle image such that the reticle image presents elements to the user that have expected engagement ranges that overlaps with or are otherwise associated with the expected engagement range of the magnification setting. As a result, in various embodiments the device 800 can be configured to present a reticle image most suitable for the expected engagement range/magnification settings of the device 800.

In various embodiments the sensor 804 may be a rotary or linear sensor that detects a position of the magnification adjustment element for the optical aiming device 800. In some embodiments the magnification sensor 804 could include a power ring angular position sensor that detects the position of a power ring that may be adjusted to control magnification. Further, in various embodiments the type of sensor utilized for the magnification sensor 804 can include, but is not limited to, encoders, laser encoders, proximity sensors, proximity switches, photoelectric sensors, photo eyes, fiber optic sensors, ultrasonic sensors, and potentiometers.

In some embodiments, the magnification sensor 804 additionally or alternatively is configured as a linear motion sensor or a position sensor that detects the position of the one or more axially spaced erector lenses 148, 149, 150, mounted within the erector tube 140 (FIG. 1A) for magnification and creation of a reticle display field in the optical pathway. For example, the sensor 804 may detect the spaced erector lenses relative to a datum, or relative to the reticle pane 144. In such embodiments, the output of the magnification sensor 804 may be used by the processor 204 to determine a change in lens position relative to one another and/or the corresponding magnification associated with that lens position.

In certain embodiments described further below, such as where the optical aiming device 800 utilizes a camera or digital display, the controls used to increase or alter the magnification of the digital display may be configured to send a signal to the processor 204 to indicate the magnification setting.

FIG. 8 is only one example of a suitable system and is not intended to suggest any limitation as to the scope of use or functionality of the embodiments described herein. Regardless, the depicted system architecture is capable of being implemented and/or performing the functionality as set forth herein.

Referring to FIGS. 9A-9D, a variety of reticle display fields 900a, 900b, 900c, and 900d are depicted, according to one or more embodiments of the disclosure. In various embodiments, each of the reticle display fields 900a, 900b, 900c, 900d, includes a primary reticle pattern 904a, 904b, 904c, 904d, each having a vertical portion 908 and a horizontal portion 912 that together indicate a central mark 916. In various embodiments the central mark 916 denotes a zero point for a zeroed in range for the reticle, as described above.

As depicted in FIGS. 9A-9D the primary reticle pattern can be configured as a variety of reticle designs. In various embodiments the primary reticle is a physical reticle formed in the reticle display field. For instance, the primary reticle could be formed via etched lines, wires, or the like, that form a permanently present element in the reticle display field. However, as described above, in some embodiments, some or all of the primary reticle could be digitally projected. Further, in certain embodiments, the some or all of the primary reticle could be a physical reticle where some or all of the physical reticle elements are energized or illuminated to improve visibility in certain conditions.

In various embodiments the reticle display fields 900a, 900b, 900c, 900d, each include a secondary reticle 920. Depicted in FIGS. 9A-9D, the secondary reticle 920 is a reticle that at least partially surrounds the central mark 916 and comprises a ring or generally circular shape. In various embodiments, the secondary reticle 920 is configured to have a generally large size relative to the central mark 916. In such embodiments, the secondary reticle 920 configured for use as a reticle in close-range situations. For example, in various embodiments the secondary reticle 920 is configured for use against targets within 50 yards, while the central mark 916 and primary reticle 904a, 904b, 904c, 904d are zeroed in for longer engagements, such as for use against targets at about 100 yards or greater. However, the intended engagement ranges for the secondary reticle 920 and the primary reticle are intended to vary. For example, the based on the design of the respective reticles, the ammunition, firearm, the zeroed in range of the optical aiming device, and other factors.

Figure 9A:
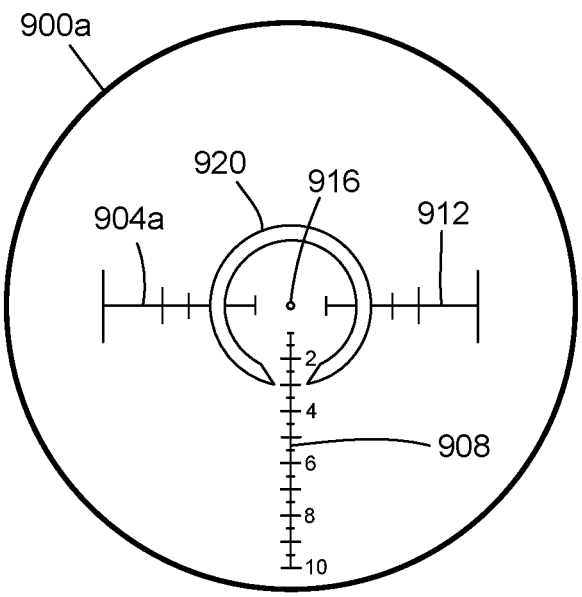
FIGS. 9A-9D depict a variety of reticle display fields, according to one or more embodiments of the disclosure.
Figure 9B:
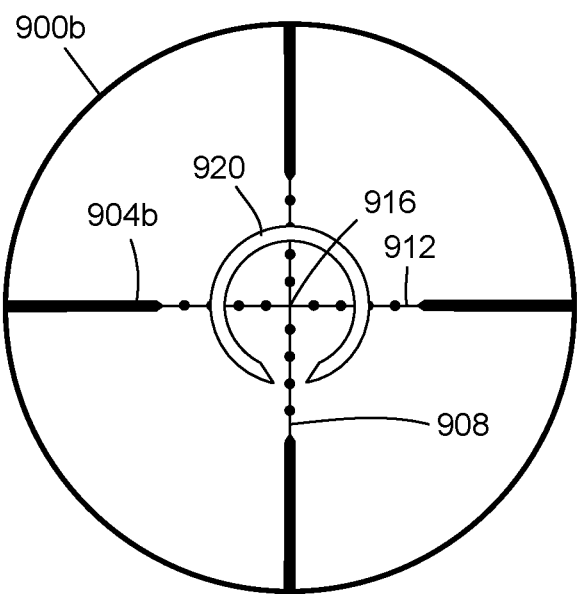
Figure 9C:
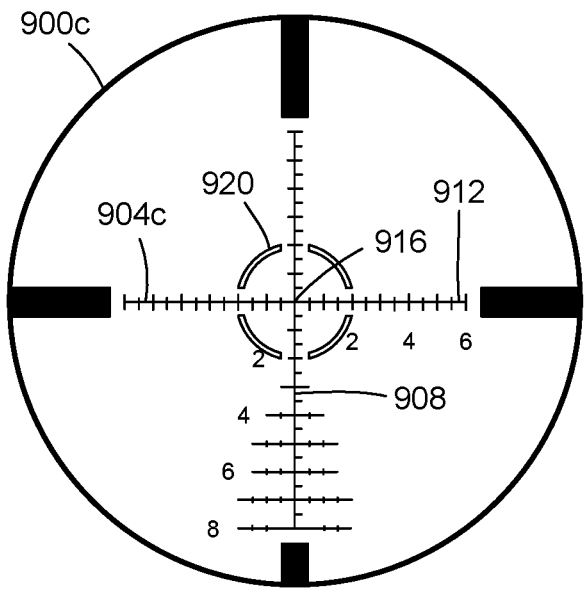
Figure 9D:
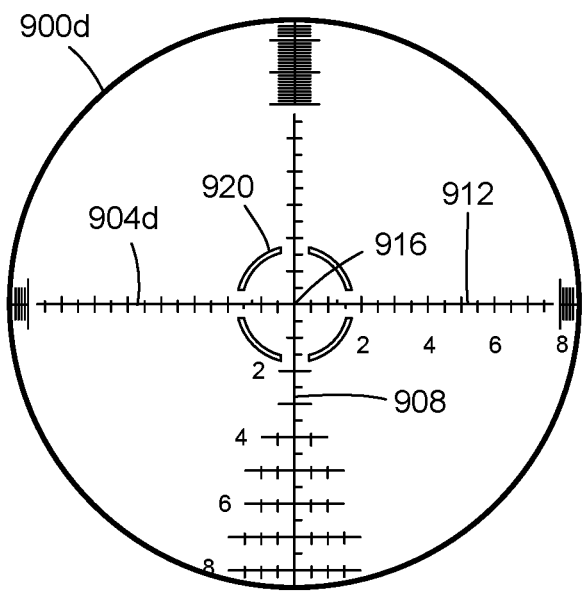

While the secondary reticle 920 is configured as a ring or generally circular shape in FIGS. 9A-9D, the secondary reticle could be configured to have any suitable reticle shape. For example, in certain embodiments the secondary reticle could be configured as a crosshairs, 2 MOA or greater red dot, a circle dot reticle, T-shaped reticle, or other suitable reticle design. Further, in various embodiments the secondary reticle 920 could be configured as a completely alternate reticle. For example, in some embodiments, the primary reticle could be configured as the reticle 900a depicted in FIG. 9A, while the secondary reticle is configured as a MIL-dot reticle 900b, such as depicted in FIG. 9B.

In various embodiments, the secondary reticle 920 is a projected reticle that is generated or projected upon the reticle pane by a display, such as display device 164 described above with reference to FIGS. 1 and 2. Accordingly, in one or more embodiments, secondary reticle 920 is entirely customizable. For example, in certain embodiments a variety of different types/designs for the secondary reticle 920 could be utilized and changed in real-time depending upon the preferences of a user. Similarly, in various embodiments, the secondary reticle 920 can be moved, removed, made larger, made smaller, or have other modifications based on the output image of a display.

In one or more embodiments the secondary reticle 920 is configured for display at particular magnification settings for an optical device associated with the reticle display field 900a, 900b, 900c, 900d. For instance, in some embodiments, the secondary reticle 920 is displayed while the optical device is configured for a 3× or lower magnification while being configured to disappear from the reticle display field 900a, 900b, 900c, 900d at magnifications set to 4× or greater. However, it is intended that the magnification settings at which the secondary reticle 920 is configured to appear or disappear can entirely vary based on the preferences of a user.

As such, in various embodiments an optical device can be configured for automatic alteration of the reticle display field 900a, 900b, 900c, 900d. In such embodiments a device can be configured to modify or otherwise alter a reticle image that is presented to a user based on an expected engagement range. As a result, in various embodiments the device can be configured to present a reticle image most suitable for the expected engagement range/magnification settings of the device.

Figure 10:
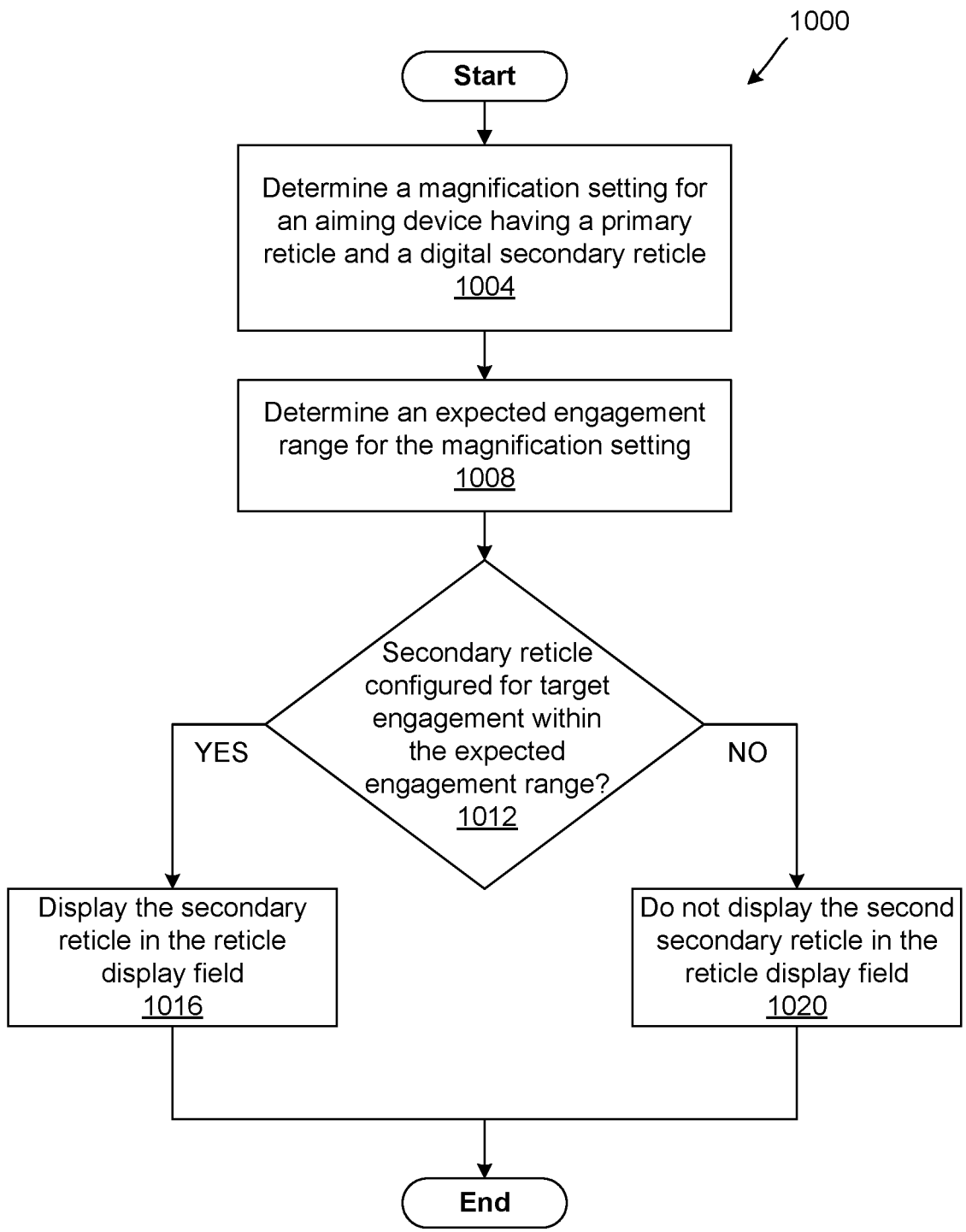
FIG. 10 depicts a flowchart diagram of a method 1000 of automatic configuration of the reticle display field in an aiming device is depicted, according to one or more embodiments

Referring to FIG. 10, a flowchart diagram of a method 1000 of automatic configuration of the reticle display field in an aiming device is depicted, according to one or more embodiments. In various embodiments, the method 1000 is implemented with an optical aiming device such as optical aiming device 800 depicted in FIG. 8. However, various embodiments apply to other types of aiming devices, such as a camera-based aiming device, described further below with reference to FIG. 13. In some embodiments, method 1000 is implemented in a larger system, described further with reference to FIG. 5.

In one or more embodiments, in operation 1004, the method 1000 includes determining a magnification setting for an aiming device having a primary reticle and a digital secondary reticle. As described above, in various embodiments the aiming device could have a plurality of magnification settings and a magnification sensor configured to produce an identifiable output to the processor of the aiming device such that the processor is able to determine the magnification setting.

In various embodiments the magnification sensor may be a rotary or linear sensor that detects a position of the magnification adjustment element for the optical aiming device. In some embodiments the magnification sensor could include a power ring angular position sensor. Further, in various embodiments the type of sensor utilized for the magnification sensor 804 can include, but is not limited to, encoders, laser encoders, proximity sensors, proximity switches, photoelectric sensors, photo eyes, fiber optic sensors, ultrasonic sensors, and potentiometers.

In various embodiments, the aiming device will present a reticle display field to a user through a viewing portion of the aiming device. In such embodiments the reticle display field can include a primary reticle pattern that indicates a central mark for assisting the user in aiming. In one or more embodiments, the primary reticle is a physical reticle, formed via etched lines, wires, or the like, that forms a permanently present element in the reticle display field. However, as described above, in some embodiments, some or all of the primary reticle could be digitally projected. Further, in certain embodiments, the some or all of the primary reticle could be a physical reticle where some or all of the physical reticle elements are energized or illuminated.

In various embodiments the reticle display field optionally includes a digital secondary reticle. In such embodiments the secondary reticle is a projected reticle that is generated or projected upon the reticle pane by a display, such as display device 164 described above with reference to FIGS. 1 and 2.

In one or more embodiments, in operation 1008, the method 1000 includes determining an expected engagement range for the magnification setting. As described above, in various embodiments the expected engagement range is a general range at which target engagement is expected to occur using the device. For example, when the device is configured with higher magnification settings the device will have a larger expected engagement range while configurations with lower magnification settings will generally provide a lower expected engagement range.

In certain embodiments the expected engagement range for the magnification setting can be determined via pre-determined a lookup-table that includes associations between various magnification settings and engagement ranges. In some embodiments, the lookup-table can simply include associations between various magnification settings and reticle designs/secondary reticles. In such embodiments, the connection between engagement range and magnification settings can be determined prior to use, with the resulting associations between various reticles and device magnification settings programmed into the lookup-table stored in memory. In some embodiments the expected engagement range could be determined via an algorithm in real-time.

In one or more embodiments, at decision block 1012, the method 1000 includes determining whether the secondary reticle is configured for target engagement within the expected engagement range. In various embodiments, by determining whether the secondary reticle is configured for use within the expected engagement range, the aiming device can then modify or otherwise alter a reticle image that is presented to a user based on the determined expected engagement range. As a result, in various embodiments the aiming device can be configured to present a reticle image most suitable for the expected engagement range/magnification settings of the device.

For example, in certain embodiments the expected engagement range for the secondary reticle can be determined via pre-determined a lookup-table that includes associations between various secondary reticle designs and engagement ranges. In some embodiments, the lookup-table can simply include associations between various magnification settings and reticle designs/secondary reticles. In such embodiments, the connection between engagement range and magnification settings can be determined prior to use, with the resulting associations between various reticles and device magnification settings programmed into the lookup-table stored in memory. For example, in certain embodiments, the device could determine an expected engagement range that includes close-range targets, such as targets within 50 yards, based on a magnification setting of 3× or lower. As such, in various embodiments where the secondary reticle is associated with engagement ranges within 50 yards the device can determine that the secondary reticle should be presented to the user. Similarly, where the device determines an expected engagement range that does not include clos-range targets the device can determine that the secondary reticle should not be presented to the user.

If, at decision block 1012, the secondary reticle is configured for target engagement within the expected engagement range then the method 1000 proceeds to operation 1016 where the method 1000 includes displaying the secondary reticle in the reticle display field.

If, at decision block 1012, the secondary reticle is not configured for target engagement within the expected engagement range then the method 1000 proceeds to operation 1020 where the method 1000 includes not displaying the secondary reticle in the reticle display field.

Figure 11:
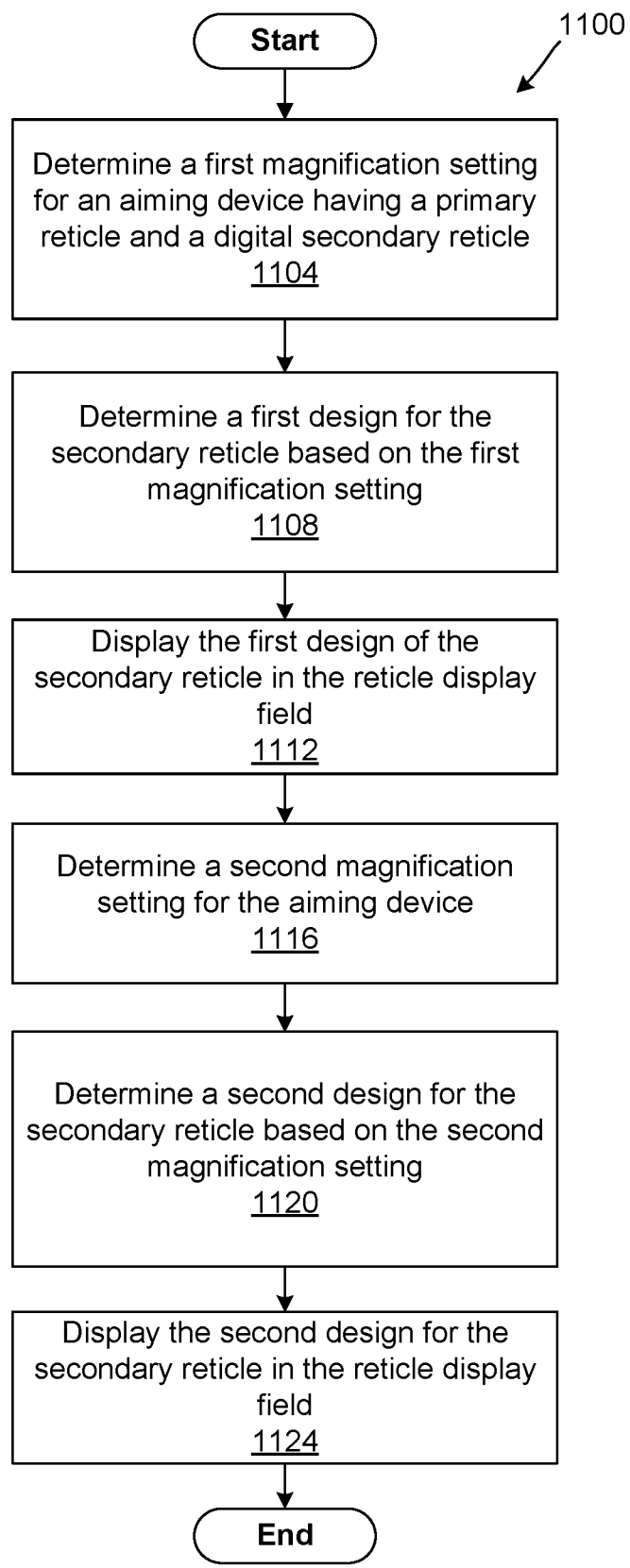
FIG. 11 depicts a flowchart diagram of a method 1000 of automatic configuration of the reticle display field in an aiming device, according to one or more embodiments of the disclosure.

Referring to FIG. 11, a flowchart diagram of a method 1100 of automatic configuration of the reticle display field in an aiming device is depicted, according to one or more embodiments. In various embodiments, the method 1100 is implemented with an optical aiming device such as optical aiming device 800 depicted in FIG. 8. However, various embodiments apply to other types of aiming devices, such as a camera-based aiming device, described further below with reference to FIG. 13. In some embodiments, method 1100 is implemented in a larger system, described further with reference to FIG. 5.

In one or more embodiments, in operation 1104, the method 1100 includes determining a magnification setting for an aiming device having a primary reticle and a digital secondary reticle.

In one or more embodiments, in operation 1108, the method 1100 includes determining a first design for the secondary reticle based on the first magnification setting. As described above, in various embodiments, the secondary reticle is a projected reticle that is generated or projected upon the reticle pane by a display, such as display device 164 described above with reference to FIGS. 1 and 2. Accordingly, in one or more embodiments, secondary reticle is entirely customizable.

In one or more embodiments, in operation 1112, the method 1100 includes displaying the first design of the secondary reticle in the reticle display field. In one or more embodiments, in operation 1116, the method 1100 includes determining a second magnification setting for the aiming device.

In one or more embodiments, in operation 1120, the method 1100 includes determining a second design for the secondary reticle based on the second magnification setting. In one or more embodiments, in operation 1124, the method 1100 includes displaying the second design for the secondary reticle in the reticle display field.

As a result, in various embodiments a variety of different types/designs for the secondary reticle could be utilized and changed in real-time from a first design to second depending upon the magnification settings of the device. Similarly, in various embodiments, changes to the design of the secondary reticle can include moving, removing, making the reticle larger, smaller, or making other modifications.

Figure 12:
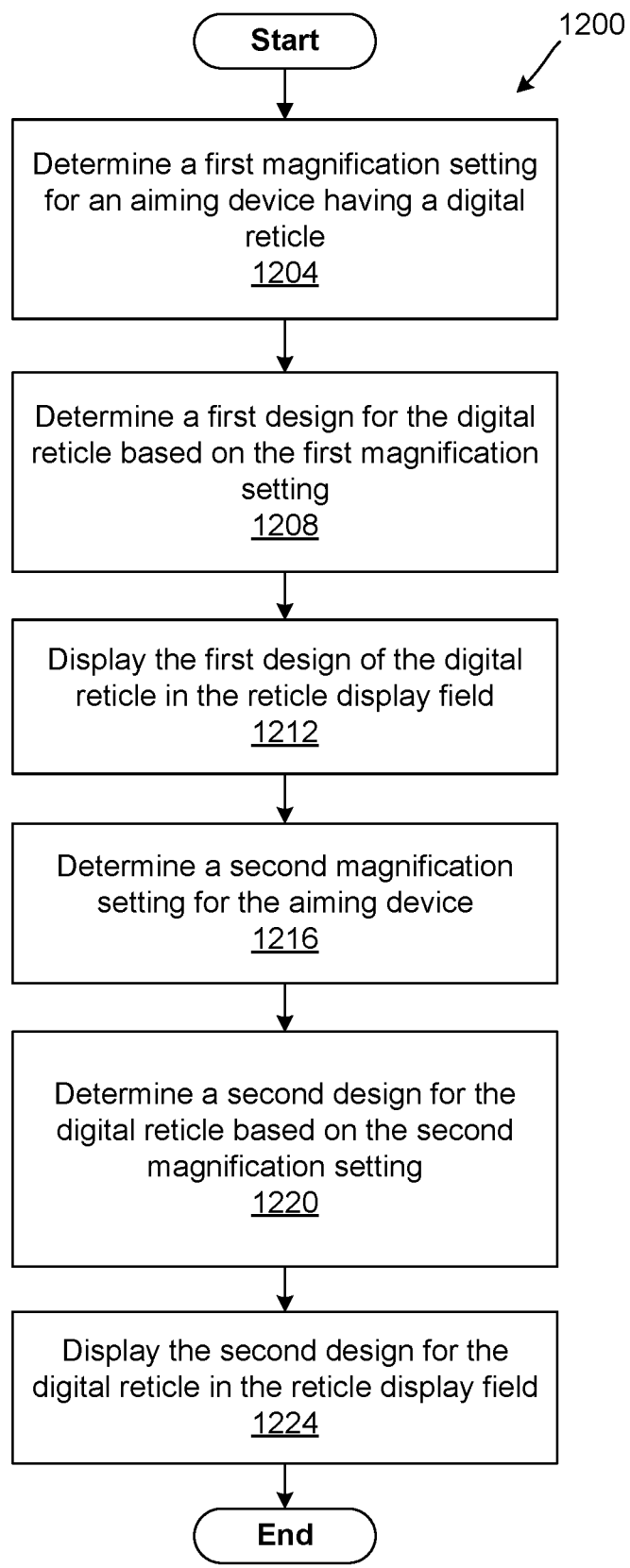
FIG. 12 depicts a flowchart diagram of a method of automatic configuration of the reticle display field in an aiming device, according to one or more embodiments of the disclosure.

Referring to FIG. 12, a flowchart diagram of a method 1200 of automatic configuration of the reticle display field in an aiming device is depicted, according to one or more embodiments. In various embodiments, the method 1200 is implemented with an optical aiming device such as optical aiming device 800 depicted in FIG. 8. However, various embodiments apply to other types of aiming devices, such as a camera-based aiming device, described further below with reference to FIG. 13. In some embodiments, method 1200 is implemented in a larger system, described further with reference to FIG. 5.

In various embodiments the method 1200 includes, at operation 1204 determining a first magnification setting for an aiming device having a digital reticle.

As described above, in some embodiments, some or all of the primary reticle of an aiming device could be digitally projected. Further, in certain embodiments, the some or all of the primary reticle could be a physical reticle where some or all of the physical reticle elements are energized or illuminated to improve visibility in certain conditions. As such, in various embodiments the primary reticle pattern can be customized/configured using one or more of a variety of reticle designs. For example, in one or more embodiments, the primary reticle could be configured based on magnification settings of the aiming device. As such, in various embodiments the method 1200 includes, at operation 1208, determining a first design for the digital reticle based on the first magnification setting. In various embodiments the method 1200 includes, at operation 1212, displaying the first design of the digital reticle in the reticle display field.

In various embodiments the method 1200 includes, at operation 1216, determining a second magnification setting for the aiming device. In various embodiments the method 1200 includes, at operation 1220, determining a second design for the digital reticle based on the second magnification setting. In various embodiments the method 1200 includes, at operation 1224, displaying the second design for the digital reticle in the reticle display field.

As a result, in various embodiments a variety of different types/designs for the reticle of the aiming device could be utilized and changed in real-time from a first design to second depending upon the magnification settings of the device. Similarly, in various embodiments, changes to the design of the reticle can include moving, removing, making the reticle larger, smaller, or making other modifications.

Figure 13:
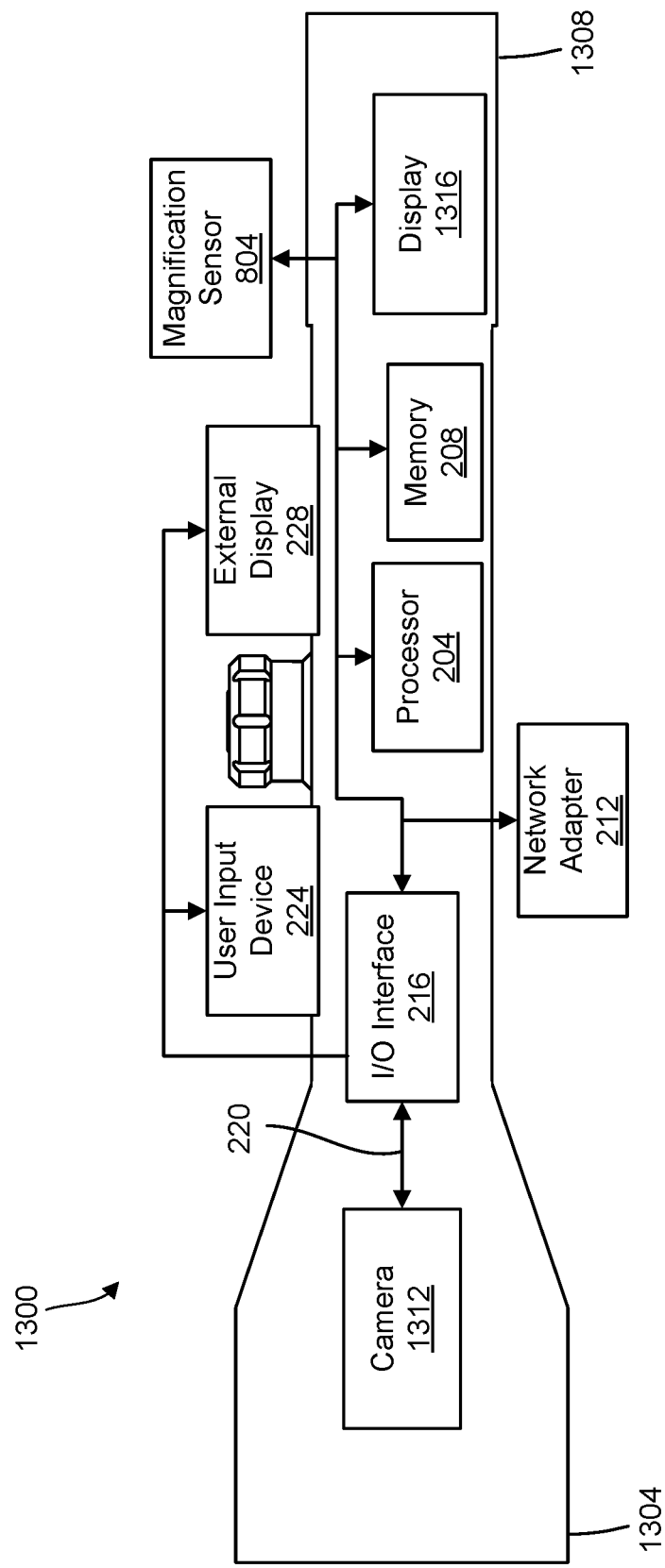
FIG. 13 depicts a system architecture for an aiming device, according to one or more embodiments of the disclosure.
Figure 14:
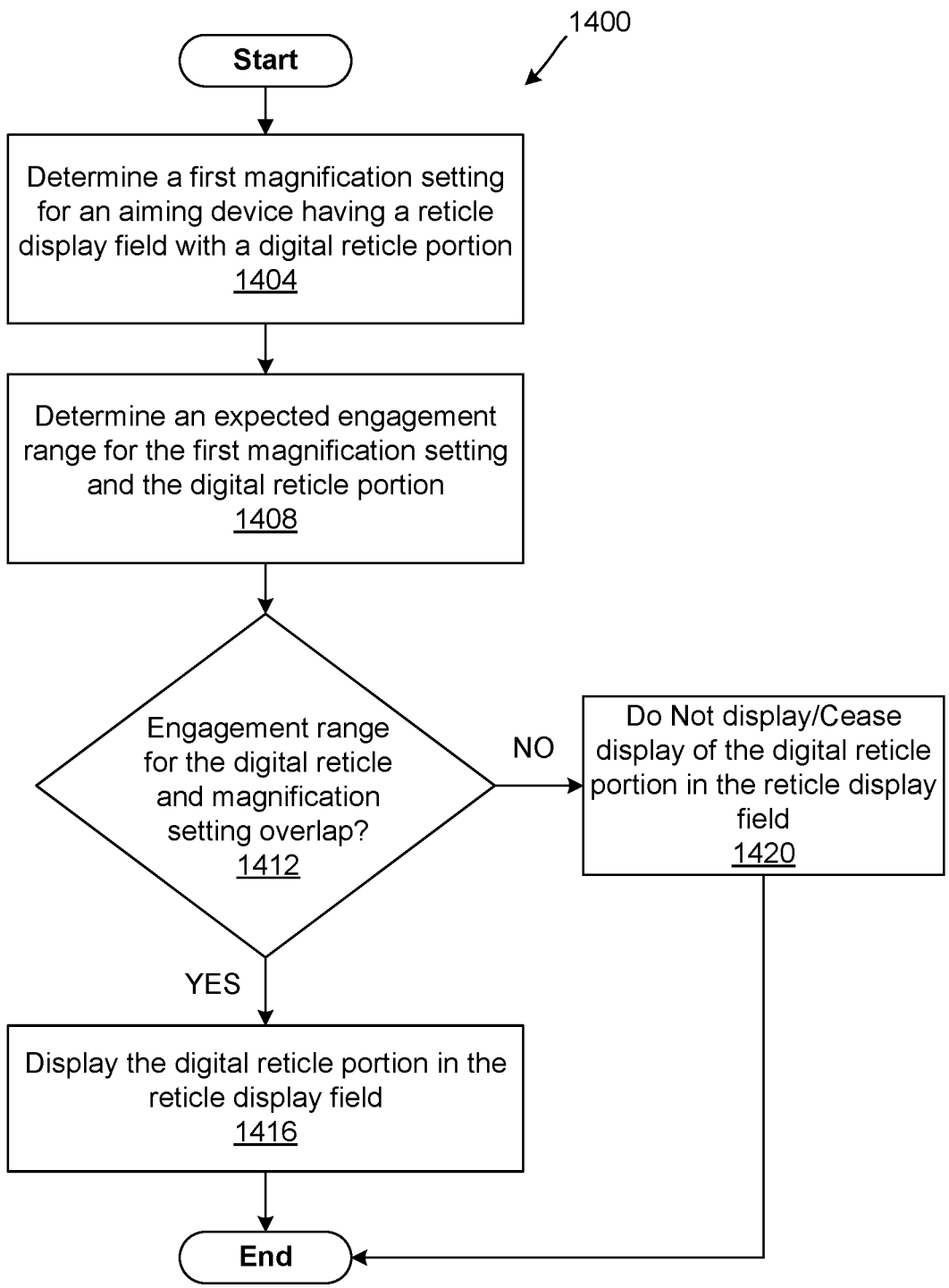
FIG. 14 depicts a flowchart diagram of a method of automatic configuration of the reticle display field in an aiming device, according to one or more embodiments of the disclosure.
Figure 15:
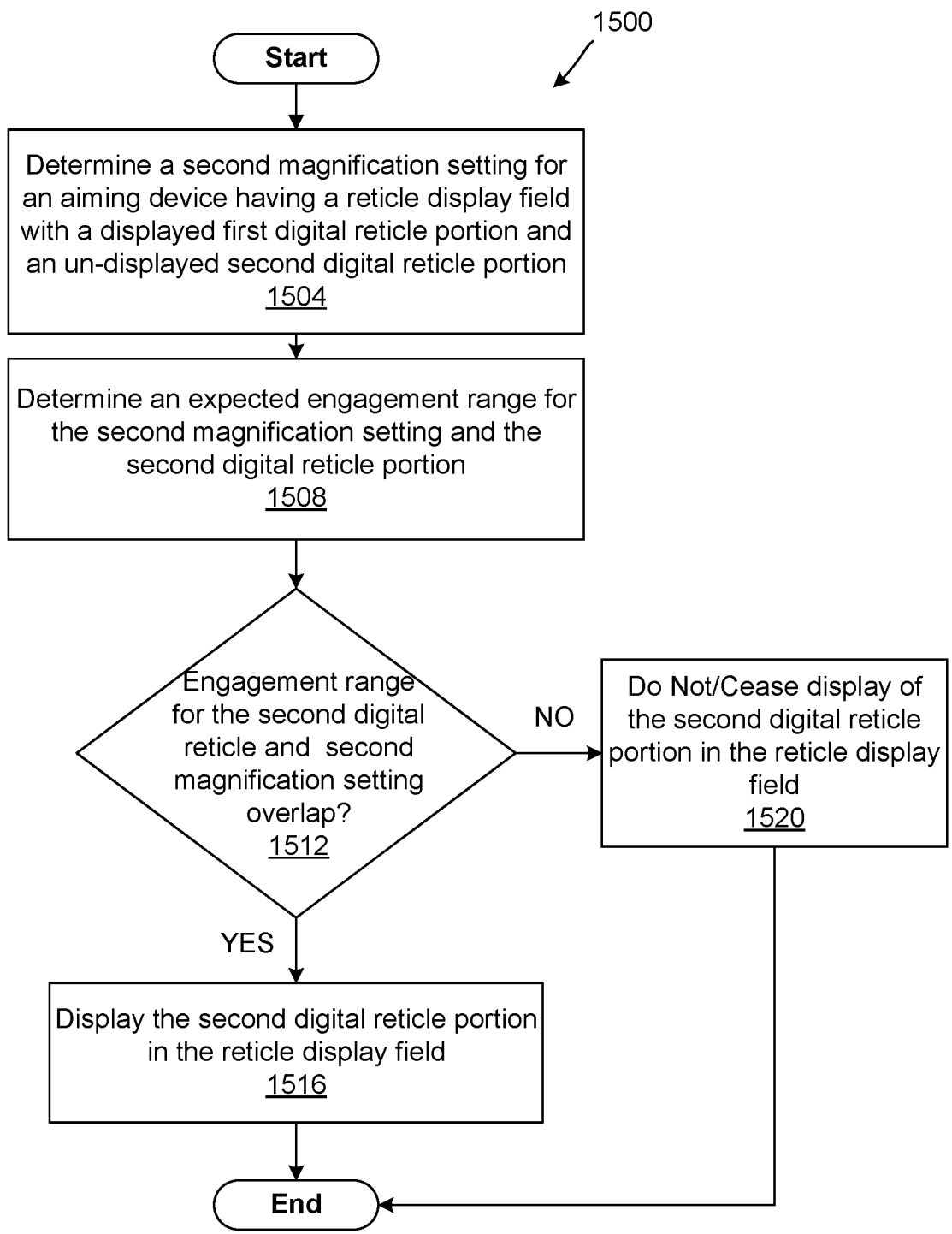
FIG. 15 depicts a flowchart diagram of a method of automatic configuration of the reticle display field in an aiming device, according to one or more embodiments of the disclosure.

Referring to FIG. 13 a system architecture for an aiming device 1300 is depicted, according to one or more embodiments of the disclosure. In various embodiments aiming device 1300 is a digital scope, including a camera in a forward objective portion 1304 of the device 1300 and a display viewable through the eyepiece portion 1308 of the device 1300 to assist the user in aiming an attached firearm, as described above. As such, various embodiments of the disclosure, such as those described above with reference to FIGS. 8-12, are entirely applicable to aiming devices including camera based aiming devices, without interior lenses or optical elements. Similarly, embodiments of the disclosure are applicable to aiming devices including a combination of camera based aiming devices with interior lenses and optical elements. For example, one or more embodiments of the disclosure are applicable to range-finding devices, smart scopes, thermographic cameras, night-vision scopes, infrared scopes, and the like.

In various embodiments, aiming device 1300 includes one or more components that are the same or substantially similar to the optical aiming device 800 depicted in FIG. 8 and like elements are referenced with the same reference numeral(s). For example, the optical aiming device 1300 includes a processor 204, a memory 208, network adaptor 212, input/output (I/O) interface 216, display 164, a bus 220 that communicatively couples various system components, a user input device 224, an external display 228, and a magnification sensor 804.

In various embodiments the aiming device 1300 is configured to magnify a down-range image through various digital means and present the magnified image to a user through the eyepiece portion. As described, magnification sensor 804 can be configured to use inputs, such as from user input device 224, used to increase or alter the magnification of the digital display 1316 to send a signal to the processor 204 to indicate the magnification setting of the device 1300.

In addition, in various embodiments the device 1300 includes an objective camera 1312 and an output display 1316. As described, in various embodiments the camera 1312 and display 1316 function to receive emitted light and to display a digital representation of the received light for view of a user through the eyepiece portion 1208 to assist the user in aiming a firearm. In various embodiments the camera 1312 can be configured to detect infrared, thermographic signatures, enhance low-light conditions, or perform other functions to function as a special-purpose scope or aiming device.

In certain embodiments, further described with reference to FIGS. 10-12, memory 208 includes at least one program product having a group of one or more logical instructions that are executable by the processor 204 to carry out the functions of the various embodiments of the disclosure.

FIG. 13 is only one example of a suitable system and is not intended to suggest any limitation as to the scope of use or functionality of the embodiments described herein. Regardless, the depicted system architecture is capable of being implemented and/or performing the functionality as set forth herein.

Referring to FIG. 14 and FIGS. 16A-16C, a flowchart diagram of a method 1400 of automatic configuration of the reticle display field in an aiming device is depicted along with reticle display fields 1600a, 1600b, and 1600c, according to one or more embodiments. Described further below, the reticle display fields 1600a, 1600b, and 1600c can correspond with various stages/operations of method 1400.

Figure 16A:
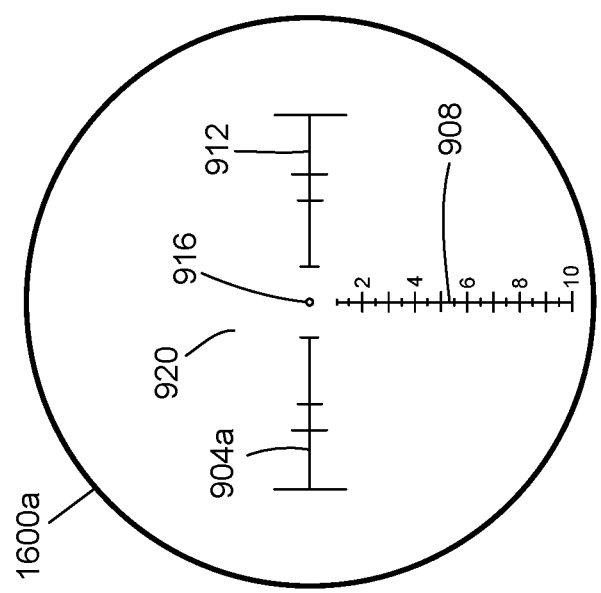
FIGS. 16A-16C depict reticle display fields, according to one or more embodiments of the disclosure.
Figure 16C:
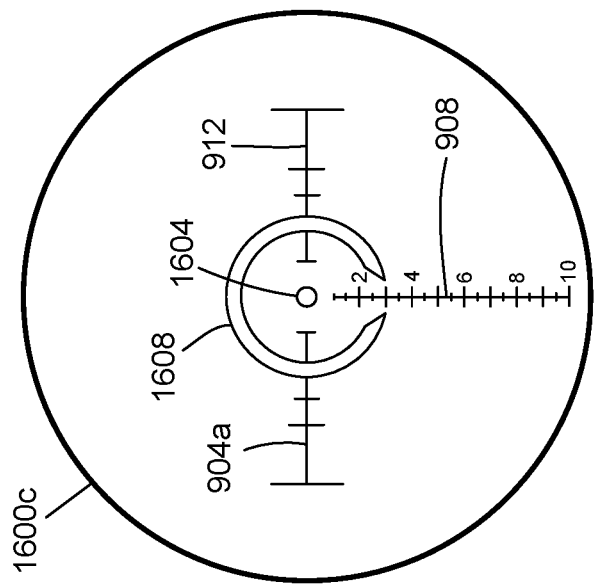
Figure 16B:
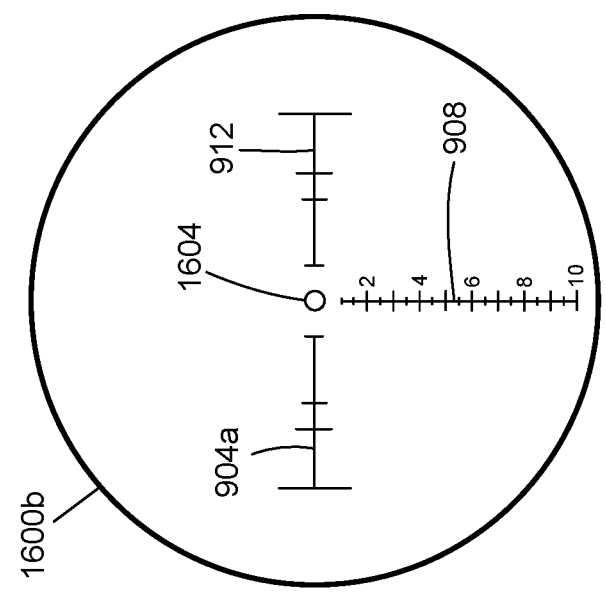

In one or more embodiments, in operation 1404, the method 1400 includes determining a first magnification setting for an aiming device having a reticle display field with a digital reticle portion. Referring to FIGS. 16A-16B, a reticle display field 1600a is depicted including a primary reticle 904a including a central mark 916. As described above, embodiments the digital reticle portion is displayed under certain conditions. For example, FIG. 16A shows the reticle display field 1600a without the digital reticle portion and reticle display field 1600*b* including the digital reticle portion 1604 being actively displayed with the primary reticle 904*a*.

As described above, in various embodiments the aiming device can be configured between one or more of a plurality of magnification settings. In such embodiments, a magnification sensor in the aiming device can produce an output signal indicating the magnification setting for determining when changes to the magnification setting have occurred and what magnification the aiming device is configured for.

In one or more embodiments, in operation 1408, the method 1400 includes determining an expected engagement range for the first magnification setting and the digital reticle portion. As described above, in certain embodiments the expected engagement range for the magnification setting and the expected engagement range for the digital reticle portions can be determined via pre-determined a lookup-table that includes associations between various magnification settings and engagement ranges and/or digital reticle portions and engagement ranges. In some embodiments, the lookup-table can simply include associations between various magnification settings and digital reticle portions. In such embodiments, the connection between engagement range and magnification settings can be determined prior to use, with the resulting associations between various reticle portions and device magnification settings programmed into the lookup-table stored in memory. In some embodiments the expected engagement range could be determined via an algorithm in real-time.

In one or more embodiments, in decision block 1412, the method 1400 includes determining whether the engagement range for the first magnification setting and the engagement range for the digital reticle portion overlap.

In one or more embodiments, in operation 1416, the method 1400 includes displaying the digital reticle portion in the reticle display field in response to determining that the expected engagement range of the first digital reticle portion and the expected engagement range of the first magnification setting at least partially overlap.

In one or more embodiments, in operation 1420, the method 1400 includes ceasing display or simply not displaying the first digital reticle portion in the reticle display field, in response to determining that the expected engagement range of the first digital reticle portion and the expected engagement range of the magnification setting do not at least partially overlap.

In various embodiments, the method 1400 is implemented with an optical aiming device such as optical aiming device 800 depicted in FIG. 8. However, various embodiments apply to other types of aiming devices, such as camera-based aiming devices, such as the aiming device 1300 depicted in in FIG. 13, or other types of aiming devices as described herein. In some embodiments, method 1400 is implemented in a larger system, described further with reference to FIG. 5.

Referring to FIG. 15, and FIGS. 16A-16C, a flowchart diagram of a method 1500 of automatic configuration of the reticle display field in an aiming device is depicted along with reticle display fields 1600*a*, 1600*b*, and 1600*c*, according to one or more embodiments. Described further below, the reticle display fields 1600*a*, 1600*b*, and 1600*c* correspond with various stages/operations of method 1500.

In various embodiments method 1500 can be implemented subsequent to operation 1416 of method 1400. As such, in various embodiments, at operation 1504, the method 1500 includes determining a second magnification setting for an aiming device having a reticle display field including a displayed first digital reticle portion and a second digital reticle portion that is not yet displayed.

As described above, in various embodiments the aiming device can be configured between one or more of a plurality of magnification settings. In such embodiments, a magnification sensor in the aiming device can produce an output signal indicating the magnification setting for determining when changes to the magnification setting have occurred and what magnification the aiming device is configured for.

Referring to FIG. 16B, a reticle display field 1600*b* is depicted including a primary reticle 904*a* along with a first digital reticle portion 1604 that is actively displayed with the primary reticle 904*a* (seen fully in reticle display field 1600*a* in FIG. 16A). Described further below, the aiming device is capable of additionally projecting a second digital reticle portion in addition to the first reticle portion 1604.

In various embodiments, at operation 1508, the method 1500 includes determining an expected engagement range for the second magnification setting and an expected engagement range for the second digital reticle portion. As described above, in certain embodiments the expected engagement range for the magnification setting and the expected engagement range for the digital reticle portions can be determined via pre-determined a lookup-table that includes associations between various magnification settings and engagement ranges and/or digital reticle portions and engagement ranges. In some embodiments, the lookup-table can simply include associations between various magnification settings and digital reticle portions. In such embodiments, the connection between engagement range and magnification settings can be determined prior to use, with the resulting associations between various reticle portions and device magnification settings programmed into the lookup-table stored in memory. In some embodiments the expected engagement range could be determined via an algorithm in real-time.

In one or more embodiments, in decision block 1512, the method 1500 includes determining whether the engagement range for the second magnification setting and the engagement range for the second digital reticle portion overlap.

In one or more embodiments, in operation 1516, the method 1500 includes displaying the second digital reticle portion in the reticle display field in response to determining that the expected engagement range of the first digital reticle portion and the expected engagement range of the first magnification setting at least partially overlap.

In one or more embodiments, in operation 1520, the method 1500 includes ceasing display or simply not displaying the second digital reticle portion in the reticle display field, in response to determining that the expected engagement range of the second digital reticle portion and the expected engagement range of the second magnification setting do not at least partially overlap.

In various embodiments, the method 1500 is implemented with an optical aiming device such as optical aiming device 800 depicted in FIG. 8. However, various embodiments apply to other types of aiming devices, such as camera-based aiming devices, such as the aiming device 1300 depicted in in FIG. 13, or other types of aiming devices as described herein. In some embodiments, method 1500 is implemented in a larger system, described further with reference to FIG. 5.

One or more embodiments may be a computer program product. The computer program product may include a computer readable storage medium (or media) including computer readable program instructions for causing a processor to configure an aiming device according to one or more embodiments described herein. For example, as described above, in one or more embodiments the operations of the various methods and embodiments described above are elements of a computer program product, included as program instructions that are embodied in a computer readable storage medium. The computer readable storage medium is a tangible device that can retain and store instructions for use by an instruction execution device. The computer readable storage medium may be, for example, an electronic storage device, a magnetic storage device, an optical storage device, or other suitable storage media.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Program instructions, as described herein, can be downloaded to respective computing/processing devices from a computer readable storage medium or to an external computer or external storage device via a network, for example, the Internet, a local area network, a wide area network and/or a wireless network. A network adapter card or network interface in each computing/processing device may receive computer readable program instructions from the network and forward the computer readable program instructions for storage in a computer readable storage medium within the respective computing/processing device.

Computer readable program instructions for carrying out one or more embodiments, as described herein, may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a single computer, or partly on the single computer and partly on a remote computer. In some embodiments, the computer readable program instructions may execute entirely on the remote computer. In the latter scenario, the remote computer may be connected to the single computer through any type of network, including a local area network (LAN) or a wide area network (WAN), or public network.

One or more embodiments are described herein with reference to a flowchart illustrations and/or block diagrams of methods, systems, and computer program products for enhancing target intercept according to one or more of the embodiments described herein. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved.

In one or more embodiments, the program instructions of the computer program product are configured as an "App" or application executable on a laptop or handheld, or other suitable computer utilizing a general-purpose operating system.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for configuring a reticle display field of an aiming device, the aiming device including a housing defining an objective portion and an eyepiece portion, the aiming device configured to present a down-range image and the reticle display field through the eyepiece portion and configurable between a plurality of magnification settings for magnifying the down-range image to a user, the system comprising:

a display device configured to display a digital reticle image in the reticle display field, the digital reticle image including a first digital reticle portion;

a magnification sensor configured to produce an output signal that indicates a magnification setting for the aiming device;

a processor; and a non-transitory computer readable storage medium, the computer readable storage medium including instructions executable by the processor to cause the processor to:
receive a first output signal from the magnification sensor, the first output signal corresponding to a first magnification setting for the aiming device;
determine, using the first output signal, the first magnification setting;
determine an expected engagement range for the first magnification setting and an expected engagement range for the first digital reticle portion;
determine that the expected engagement range of the first digital reticle portion and the expected engagement range of the first magnification setting at least partially overlap; and
in response to determining that the expected engagement range of the first digital reticle portion and the expected engagement range of the first magnification setting at least partially overlap, display, using the display device, the first digital reticle portion in the reticle display field.

2. The system of claim 1, wherein the digital reticle image includes a second digital reticle portion, and wherein the instructions included in the computer readable storage medium are executable by the processor to further cause the processor to:
receive a second output signal from the magnification sensor, the second output signal corresponding to a second magnification setting for the aiming device;
determine, using the second output signal, the second magnification setting;
determine an expected engagement range for the second magnification setting and an expected engagement range for the second digital reticle portion;
determine that the expected engagement range of the second digital reticle portion and the expected engagement range of the second magnification setting at least partially overlap; and
in response to determining that the expected engagement range of the second digital reticle portion and the expected engagement range of the second magnification setting at least partially overlap, display, using the display device, the second digital reticle portion in the reticle display field.

3. The system of claim 1, wherein the instructions included in the computer readable storage medium are further executable by the processor to:
receive a second output signal from the magnification sensor, the second output signal corresponding to a second magnification setting for the aiming device;
determine, using the second output signal, the second magnification setting;
determine an expected engagement range for the second magnification setting;
determine that the expected engagement range of the first digital reticle portion and the expected engagement range of the second magnification setting do not at least partially overlap; and
in response to determining that the expected engagement range of the first digital reticle portion and the expected engagement range of the second magnification setting do not at least partially overlap, cease displaying, using the display device, the first digital reticle portion in the reticle display field.

4. The system of claim 1, wherein the reticle display field includes a primary reticle and a secondary reticle and wherein the secondary reticle includes the first digital reticle portion.

5. The system of claim 4, wherein the primary reticle is a physical reticle.

6. The system of claim 4, wherein the digital reticle image includes a second digital reticle portion and wherein the primary reticle includes the second digital reticle portion.

7. The system of claim 6, wherein the instructions included in the computer readable storage medium are further executable by the processor to:
determine an expected engagement range for the second digital reticle portion;
determine that the expected engagement range of the second digital reticle portion and the expected engagement range of the first magnification setting at least partially overlap; and
in response to determining that the expected engagement range of the primary digital image and the expected engagement range of the first magnification setting at least partially overlap, display, using the display device, the primary digital image in the reticle display field.

8. The system of claim 1, wherein the digital reticle image is selected from one or more of a 2 MOA or greater red dot, a circle dot, or a MIL-dot.

9. The system of claim 1, wherein the aiming device includes an objective camera in the objective portion, and wherein the display device is configured to display a digital representation of the light received by the objective camera and the digital reticle image overlaid on the digital representation.

10. The system of claim 9, wherein the display device is one or more of an organic light emitting display (OLED), a standard light emitting diode (LED) display, and a liquid crystal display (LCD).

11. The system of claim 1, wherein the display device is configured to project the digital reticle image, via the beam splitter, into the reticle display field.

12. The system of claim 1, wherein the aiming device is an optical aiming device including a reticle pane and wherein the display device includes one or more LEDs mounted in the reticle pane, each of the one or more LEDs selectively energizable to form at least part of the digital reticle image.

13. A method for configuring a reticle display field of an aiming device, the aiming device including a housing defining an objective portion, an eyepiece portion for viewing the reticle display field, an objective camera in the objective portion and a display device viewable through the eyepiece portion, the display device configured to display a digital representation of a down-range image received by the objective camera and to display a digital reticle image in the reticle display field, the digital reticle image including a first digital reticle portion, the aiming device configurable between a plurality of magnification settings for magnifying a down-range image to a user, and the aiming device further including a magnification sensor configured to produce an output signal that indicates a magnification setting for the aiming device, the method comprising:
receiving a first output signal from the magnification sensor, the first output signal corresponding to a first magnification setting for the aiming device;
determining, using the first output signal, the first magnification setting;

determining an expected engagement range for the first magnification setting and an expected engagement range for the first digital reticle portion;

determining that the expected engagement range of the first digital reticle portion and the expected engagement range of the first magnification setting at least partially overlap; and in response to determining that the expected engagement range of the first digital reticle portion and the expected engagement range of the first magnification setting at least partially overlap, displaying, using the display device, the first digital reticle portion in the reticle display field.

14. The method of claim 13, wherein the method further comprises:
receiving a second output signal from the magnification sensor, the second output signal corresponding to a second magnification setting for the aiming device;

determining, using the second output signal, the second magnification setting;

determining an expected engagement range for the second magnification setting;

determining that the expected engagement range of the first digital reticle portion and the expected engagement range of the second magnification setting do not at least partially overlap; and in response to determining that the expected engagement range of the first digital reticle portion and the expected engagement range of the second magnification setting do not at least partially overlap, cease displaying, using the display device, the first digital reticle portion in the reticle display field.

15. The method of claim 13, wherein the reticle display field includes a primary reticle and a secondary reticle and wherein the secondary reticle includes the first digital reticle portion.

16. The method of claim 15, wherein the primary reticle is a physical reticle permanently present in the reticle display field.

17. The method of claim 15, wherein the digital reticle image includes a second digital reticle portion and wherein the primary reticle includes the second digital reticle portion.

18. The method of claim 17, wherein the method further comprises
determining an expected engagement range for the second digital reticle portion;

determining that the expected engagement range of the second digital reticle portion and the expected engagement range of the first magnification setting at least partially overlap; and in response to determining that the expected engagement range of the primary digital image and the expected engagement range of the first magnification setting at least partially overlap, displaying, using the display device, the primary digital image in the reticle display field.

19. The method of claim 13, wherein the display device is one or more of an organic light emitting display (OLED), a standard light emitting diode (LED) display, and a liquid crystal display (LCD).

20. An aiming device comprising:
a housing extending from a forward objective portion including an objective lens to a rearward eyepiece portion including an ocular lens, the housing defining a down-range image and a reticle display field viewable through the eyepiece portion, the aiming device configurable between a plurality of magnification settings for magnifying the down-range image to a user;

a display device configured to display a digital reticle image in the reticle display field, the digital reticle image including a first digital reticle portion;

a magnification sensor configured to produce an output signal that indicates the magnification setting of the aiming device;

a processor; and a non-transitory computer readable storage medium coupled with the processor, wherein the computer readable storage medium includes instructions, executable by the processor, to cause the aiming device to:

receive a second output signal from the magnification sensor, the second output signal corresponding to a second magnification setting for the aiming device;

determine, using the second output signal, the second magnification setting;

determine an expected engagement range for the second magnification setting;

determine an expected engagement range for the second digital reticle portion;

determine that the expected engagement range of the second digital reticle portion and the expected engagement range of the second magnification setting at least partially overlap; and in response to determining that the expected engagement range of the second digital reticle portion and the expected engagement range of the second magnification setting at least partially overlap, display, using the display device, the second digital reticle portion in the reticle display field.

* * * * *